US008743346B2

(12) United States Patent
Inoue

(10) Patent No.: US 8,743,346 B2
(45) Date of Patent: Jun. 3, 2014

(54) RANGE IMAGE SENSOR, RANGE IMAGE GENERATING APPARATUS, RANGE IMAGE DATA OBTAINING METHOD AND RANGE IMAGE GENERATING METHOD

(75) Inventor: Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 260 days.

(21) Appl. No.: 13/208,626

(22) Filed: Aug. 12, 2011

(65) Prior Publication Data

US 2012/0050713 A1 Mar. 1, 2012

(30) Foreign Application Priority Data

Aug. 24, 2010 (JP) .................................. 2010-187637

(51) Int. Cl.
*G01C 3/08* (2006.01)
(52) U.S. Cl.
USPC ......... 356/3.11; 356/3.1; 356/3.09; 356/3.12; 356/9; 356/625; 356/496; 356/482; 356/485; 356/492; 235/419; 250/559.19
(58) Field of Classification Search
USPC ........... 356/3.11, 3.1, 3.09, 3.12, 9, 625, 496, 356/482, 485, 492; 235/419; 250/559.19
See application file for complete search history.

(56) References Cited

U.S. PATENT DOCUMENTS 5,621,527 A * 4/1997 Kaneda et al. ................ 356/499
7,675,629 B2 * 3/2010 Ohsaki et al. ................ 356/515

FOREIGN PATENT DOCUMENTS

| JP | 61-149921 A | 7/1986 |
|----|----|----|
| JP | 63-145907 A | 6/1988 |
| JP | 10-074326 A | 3/1998 |
| JP | 2005-003367 A | 1/2005 |
| JP | 2005-106627 A | 4/2005 |
| JP | 2006-153773 A | 6/2006 |
| JP | 4380557 B2 | 8/2006 |
| JP | 2007-187581 A | 7/2007 |
| JP | 2007187581 A * | 7/2007 |

OTHER PUBLICATIONS

Dept. of Physics, Univ. of Illinois at Urbana-Champaign. "Green and Red Lasers Through a Diffraction Grating". 1996. http://demo.physics.uiuc.edu/lectdemo/scripts/demo_descript.idc?DemoID=1044.*
Japanese Office Action dated Jul. 31, 2012, issued in counterpart Japanese Application No. 2010-187637, and English translation thereof.

* cited by examiner

*Primary Examiner* — Luke Ratcliffe
*Assistant Examiner* — Samantha K Abraham
(74) *Attorney, Agent, or Firm* — Holtz Holtz Goodman & Chick PC

(57) ABSTRACT

The present invention provides an inexpensive range image sensor and etc. A range image sensor comprises diffractive optical elements and on which are formed diffractive gratings that change a traveling direction of incident parallel light so that in a coordinate space defined by a xyz-axis, the incident parallel light is split into split beams, and angles formed by the x-axis and line segments determined by projected light spots formed by the split beams on a predetermined projection plane intersecting the z-axis become predetermined angles. Furthermore, the range image sensor is provided with a distance determining unit for determining distances to the projected light spots on the basis of the tilting with respect to the x-axis of the line segments determined by the projected light spots formed on the object by the split beams.

13 Claims, 23 Drawing Sheets

FIG. 3A
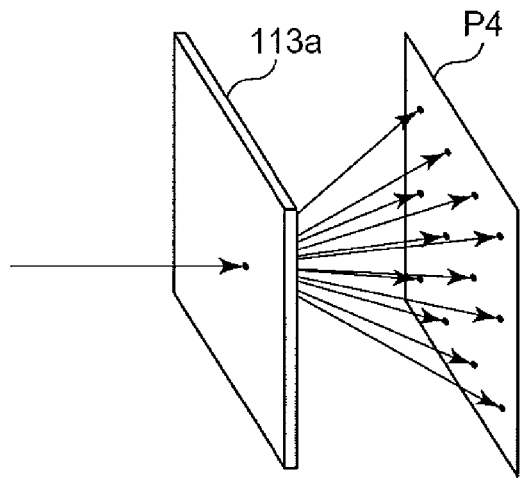
FIG. 3B
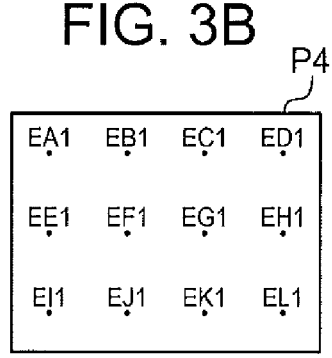
FIG. 3C

| REGION | START POINT COORDINATE | | | END POINT COORDINATE | | | DIRECTION RATIO | | | DIRECTION COSINE | | |
|---|---|---|---|---|---|---|---|---|---|---|---|---|
| | x | y | z | x' | y' | z' | x'-x | y'-y | z'-z | l | m | n |
| A1 | -5 | 0 | 0 | -1,500 | 995 | 4,000 | -1,495 | 995 | 4,000 | -0.3409632 | 0.2269287 | 0.9122760 |
| B1 | -5 | 0 | 0 | -500 | 995 | 4,000 | -495 | 995 | 4,000 | -0.1192337 | 0.2396717 | 0.9635044 |
| C1 | -5 | 0 | 0 | 500 | 995 | 4,000 | 505 | 995 | 4,000 | 0.1216072 | 0.2396022 | 0.9632250 |
| D1 | -5 | 0 | 0 | 1,500 | 995 | 4,000 | 1,505 | 995 | 4,000 | 0.3429764 | 0.2267518 | 0.9115651 |
| E1 | -5 | 0 | 0 | -1,500 | -5 | 4,000 | -1,495 | -5 | 4,000 | -0.3500965 | -0.0011709 | 0.9367129 |
| F1 | -5 | 0 | 0 | -500 | -5 | 4,000 | -495 | -5 | 4,000 | -0.1228131 | -0.0012405 | 0.9924290 |
| G1 | -5 | 0 | 0 | 500 | -5 | 4,000 | 505 | -5 | 4,000 | 0.1252556 | -0.0012402 | 0.9921237 |
| H1 | -5 | 0 | 0 | 1,500 | -5 | 4,000 | 1,505 | -5 | 4,000 | 0.3521487 | -0.0011699 | 0.9359433 |
| I1 | -5 | 0 | 0 | -1,500 | -1,005 | 4,000 | -1,495 | -1,005 | 4,000 | -0.3407859 | -0.2290902 | 0.9118019 |
| J1 | -5 | 0 | 0 | -500 | -1,005 | 4,000 | -495 | -1,005 | 4,000 | -0.1191646 | -0.2419402 | 0.9629459 |
| K1 | -5 | 0 | 0 | 500 | -1,005 | 4,000 | 505 | -1,005 | 4,000 | 0.1215367 | -0.2418701 | 0.9626670 |
| L1 | -5 | 0 | 0 | 1,500 | -1,005 | 4,000 | 1,505 | -1,005 | 4,000 | 0.3427984 | -0.2289119 | 0.9110920 |

FIG. 4A

| REGION | START POINT COORDINATE | | | END POINT COORDINATE | | | DIRECTION RATIO | | | DIRECTION COSINE | | |
|---|---|---|---|---|---|---|---|---|---|---|---|---|
| | x | y | z | x' | y' | z' | x'-x | y'-y | z'-z | l | m | n |
| A2 | 5 | 0 | 0 | -1,500 | 1,005 | 4,000 | -1,505 | 1,005 | 4,000 | -0.3427984 | 0.2289119 | 0.9110920 |
| B2 | 5 | 0 | 0 | -500 | 1,005 | 4,000 | -505 | 1,005 | 4,000 | -0.1215367 | 0.2418701 | 0.9626670 |
| C2 | 5 | 0 | 0 | 500 | 1,005 | 4,000 | 495 | 1,005 | 4,000 | 0.1191646 | 0.2419402 | 0.9629459 |
| D2 | 5 | 0 | 0 | 1,500 | 1,005 | 4,000 | 1,495 | 1,005 | 4,000 | 0.3407859 | 0.2290902 | 0.9118019 |
| E2 | 5 | 0 | 0 | -1,500 | 5 | 4,000 | -1,505 | 5 | 4,000 | -0.3521487 | 0.0011699 | 0.9359433 |
| F2 | 5 | 0 | 0 | -500 | 5 | 4,000 | -505 | 5 | 4,000 | -0.1252556 | 0.0012402 | 0.9921237 |
| G2 | 5 | 0 | 0 | 500 | 5 | 4,000 | 495 | 5 | 4,000 | 0.1228131 | 0.0012405 | 0.9924290 |
| H2 | 5 | 0 | 0 | 1,500 | 5 | 4,000 | 1,495 | 5 | 4,000 | 0.3500965 | 0.0011709 | 0.9367129 |
| I2 | 5 | 0 | 0 | -1,500 | -995 | 4,000 | -1,505 | -995 | 4,000 | -0.3429764 | -0.2267518 | 0.9115651 |
| J2 | 5 | 0 | 0 | -500 | -995 | 4,000 | -505 | -995 | 4,000 | -0.1216072 | -0.2396022 | 0.9632250 |
| K2 | 5 | 0 | 0 | 500 | -995 | 4,000 | 495 | -995 | 4,000 | 0.1192337 | -0.2396717 | 0.9635044 |
| L2 | 5 | 0 | 0 | 1,500 | -995 | 4,000 | 1,495 | -995 | 4,000 | 0.3409632 | -0.2269287 | 0.9122760 |

FIG. 4B

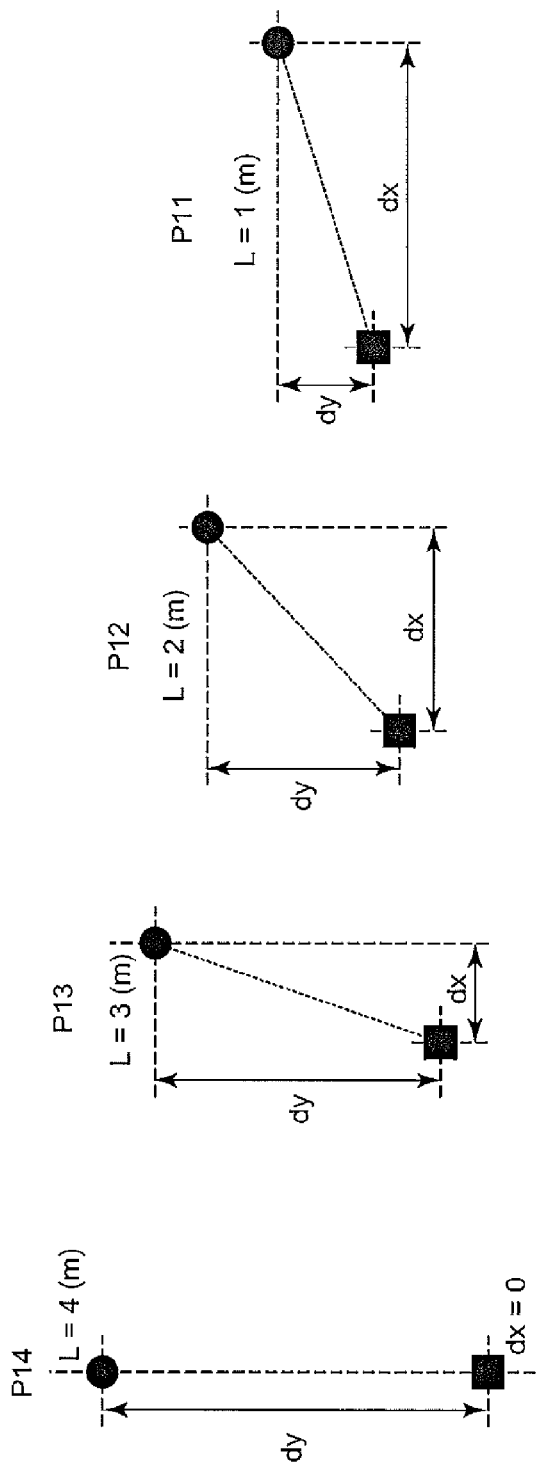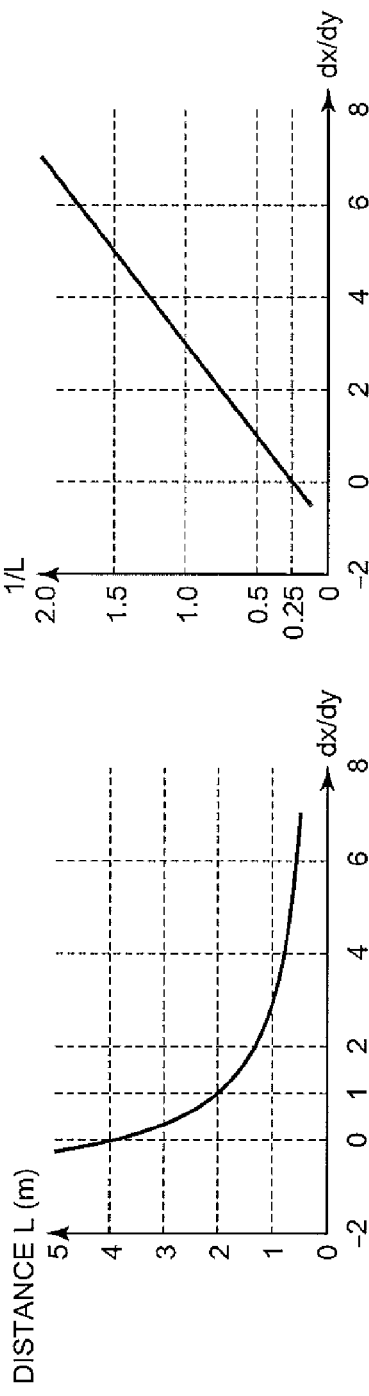

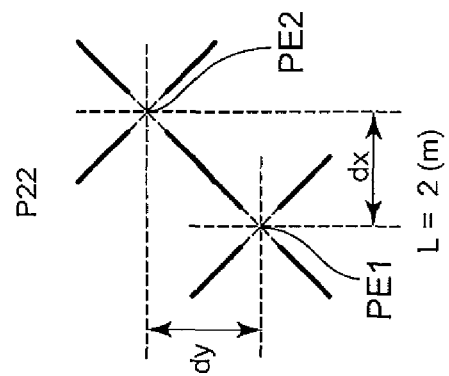
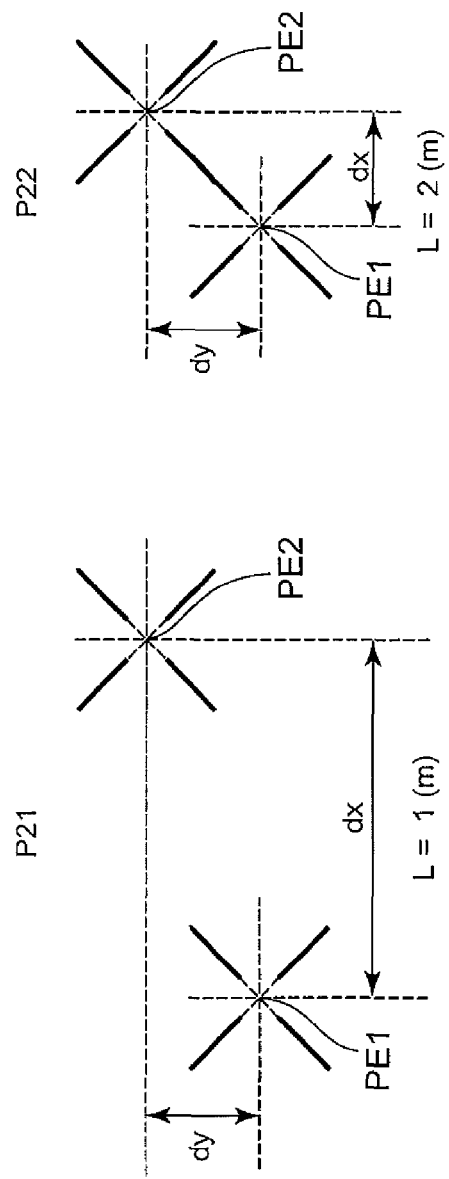
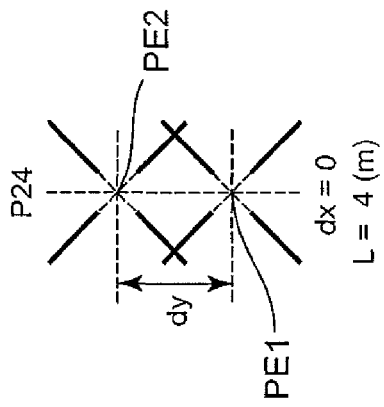
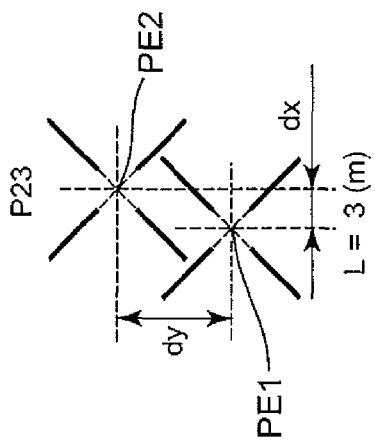

L = 1 (m)

L = 2 (m)

L = 3 (m)

L = 4 (m)

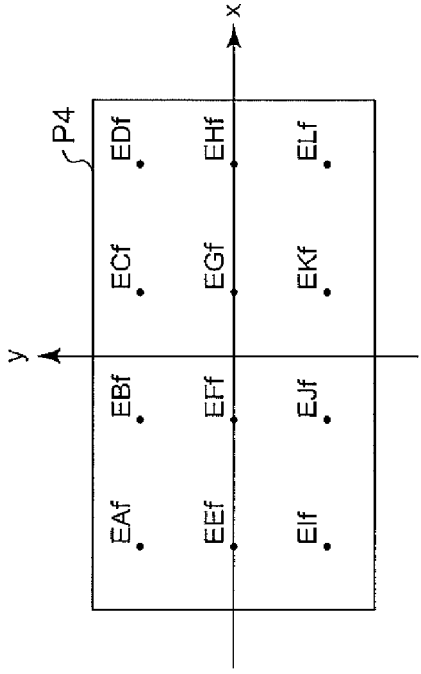
FIG. 19A
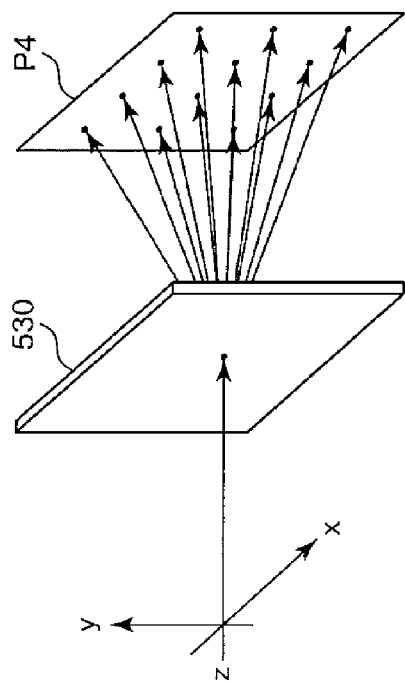
FIG. 19B
FIG. 19C
| REGION | START POINT COORDINATE | | | END POINT COORDINATE | | | DIRECTION RATIO | | | DIRECTION COSINE | | |
|---|---|---|---|---|---|---|---|---|---|---|---|---|
| | x | y | z | x' | y' | z' | x'-x | y'-y | z'-z | l | m | n |
| Af | 0 | 0 | 0 | -1,500 | 1,000 | 4,000 | -1,500 | 1,000 | 4,000 | -0.3418817 | 0.2279212 | 0.9116846 |
| Bf | 0 | 0 | 0 | -500 | 1,000 | 4,000 | -500 | 1,000 | 4,000 | -0.1203859 | 0.2407717 | 0.9630868 |
| Cf | 0 | 0 | 0 | 500 | 1,000 | 4,000 | 500 | 1,000 | 4,000 | 0.1203859 | 0.2407717 | 0.9630868 |
| Df | 0 | 0 | 0 | 1,500 | 1,000 | 4,000 | 1,500 | 1,000 | 4,000 | 0.3418817 | 0.2279212 | 0.9116846 |
| Ef | 0 | 0 | 0 | -1,500 | 0 | 4,000 | -1,500 | 0 | 4,000 | -0.3511234 | 0.0000000 | 0.9363292 |
| Ff | 0 | 0 | 0 | -500 | 0 | 4,000 | -500 | 0 | 4,000 | -0.1240347 | 0.0000000 | 0.9922779 |
| Gf | 0 | 0 | 0 | 500 | 0 | 4,000 | 500 | 0 | 4,000 | 0.1240347 | 0.0000000 | 0.9922779 |
| Hf | 0 | 0 | 0 | 1,500 | 0 | 4,000 | 1,500 | 0 | 4,000 | 0.3511234 | 0.0000000 | 0.9363292 |
| If | 0 | 0 | 0 | -1,500 | -1,000 | 4,000 | -1,500 | -1,000 | 4,000 | -0.3418817 | -0.2279212 | 0.9116846 |
| Jf | 0 | 0 | 0 | -500 | -1,000 | 4,000 | -500 | -1,000 | 4,000 | -0.1203859 | -0.2407717 | 0.9630868 |
| Kf | 0 | 0 | 0 | 500 | -1,000 | 4,000 | 500 | -1,000 | 4,000 | 0.1203859 | -0.2407717 | 0.9630868 |
| Lf | 0 | 0 | 0 | 1,500 | -1,000 | 4,000 | 1,500 | -1,000 | 4,000 | 0.3418817 | -0.2279212 | 0.9116846 |

FIG. 20A

TR REGION NAME TABLE

| ELEMENT REGION INDEX | DIFFRACTIVE REGION INDEX | | | | | | | | | | |
|---|---|---|---|---|---|---|---|---|---|---|---|
| | a | b | c | d | e | f | g | h | i | j | k |
| A | Aa | Ab | Ac | Ad | Ae | Af | Ag | Ah | Ai | Aj | Ak |
| B | Ba | Bb | Bc | Bd | Be | Bf | Bg | Bh | Bi | Bj | Bk |
| C | Ca | Cb | Cc | Cd | Ce | Cf | Cg | Ch | Ci | Cj | Ck |
| D | Da | Db | Dc | Dd | De | Df | Dg | Dh | Di | Dj | Dk |
| E | Ea | Eb | Ec | Ed | Ee | Ef | Eg | Eh | Ei | Ej | Ek |
| F | Fa | Fb | Fc | Fd | Fe | Ff | Fg | Fh | Fi | Fj | Fk |
| G | Ga | Gb | Gc | Gd | Ge | Gf | Gg | Gh | Gi | Gj | Gk |
| H | Ha | Hb | Hc | Hd | He | Hf | Hg | Hh | Hi | Hj | Hk |
| I | Ia | Ib | Ic | Id | Ie | If | Ig | Ih | Ii | Ij | Ik |
| J | Ja | Jb | Jc | Jd | Je | Jf | Jg | Jh | Ji | Jj | Jk |
| K | Ka | Kb | Kc | Kd | Ke | Kf | Kg | Kh | Ki | Kj | Kk |
| L | La | Lb | Lc | Ld | Le | Lf | Lg | Lh | Li | Lj | Lk |

FIG. 20B

TSx START POINT x COORDINATE TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | -5 | -4 | -3 | -2 | -1 | 0 | 1 | 2 | 3 | 4 | 5 |
| B | -5 | -4 | -3 | -2 | -1 | 0 | 1 | 2 | 3 | 4 | 5 |
| C | -5 | -4 | -3 | -2 | -1 | 0 | 1 | 2 | 3 | 4 | 5 |
| D | -5 | -4 | -3 | -2 | -1 | 0 | 1 | 2 | 3 | 4 | 5 |
| E | -5 | -4 | -3 | -2 | -1 | 0 | 1 | 2 | 3 | 4 | 5 |
| F | -5 | -4 | -3 | -2 | -1 | 0 | 1 | 2 | 3 | 4 | 5 |
| G | -5 | -4 | -3 | -2 | -1 | 0 | 1 | 2 | 3 | 4 | 5 |
| H | -5 | -4 | -3 | -2 | -1 | 0 | 1 | 2 | 3 | 4 | 5 |
| I | -5 | -4 | -3 | -2 | -1 | 0 | 1 | 2 | 3 | 4 | 5 |
| J | -5 | -4 | -3 | -2 | -1 | 0 | 1 | 2 | 3 | 4 | 5 |
| K | -5 | -4 | -3 | -2 | -1 | 0 | 1 | 2 | 3 | 4 | 5 |
| L | -5 | -4 | -3 | -2 | -1 | 0 | 1 | 2 | 3 | 4 | 5 |

FIG. 20C

TSy START POINT y COORDINATE TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | 0 | 0 | 0 | 0 | 0 | 0 | 0 | 0 | 0 | 0 | 0 |
| B | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 |
| F | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 |
| I | 0 | 0 | 0 | 0 | 0 | 0 | 0 | 0 | 0 | 0 | 0 |
| J | 0 | 0 | 0 | 0 | 0 | 0 | 0 | 0 | 0 | 0 | 0 |
| K | 0 | 0 | 0 | 0 | 0 | 0 | 0 | 0 | 0 | 0 | 0 |
| L | 0 | 0 | 0 | 0 | 0 | 0 | 0 | 0 | 0 | 0 | 0 |

FIG. 20D

TSz START POINT z COORDINATE TABLE

| ELEMENT REGION NUMBER | DIFFRACTIVE REGION NUMBER | | | | | | | | | | |
|---|---|---|---|---|---|---|---|---|---|---|---|
| | a | b | c | d | e | f | g | h | i | j | k |
| A | 0 | 0 | 0 | 0 | 0 | 0 | 0 | 0 | 0 | 0 | 0 |
| B | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 |
| E | 0 | 0 | 0 | 0 | 0 | 0 | 0 | 0 | 0 | 0 | 0 |
| F | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 |
| H | 0 | 0 | 0 | 0 | 0 | 0 | 0 | 0 | 0 | 0 | 0 |
| I | 0 | 0 | 0 | 0 | 0 | 0 | 0 | 0 | 0 | 0 | 0 |
| J | 0 | 0 | 0 | 0 | 0 | 0 | 0 | 0 | 0 | 0 | 0 |
| K | 0 | 0 | 0 | 0 | 0 | 0 | 0 | 0 | 0 | 0 | 0 |
| L | 0 | 0 | 0 | 0 | 0 | 0 | 0 | 0 | 0 | 0 | 0 |

FIG. 21A

TEx END POINT x COORDINATE TABLE

| | | \multicolumn{11}{c|}{DIFFRACTIVE REGION NUMBER} |
|---|---|---|---|---|---|---|---|---|---|---|---|---|
| | | a | b | c | d | e | f | g | h | i | j | k |
| ELEMENT REGION NUMBER | A | -1,500 | -1,500 | -1,500 | -1,500 | -1,500 | -1,500 | -1,500 | -1,500 | -1,500 | -1,500 | -1,500 |
| | B | -500 | -500 | -500 | -500 | -500 | -500 | -500 | -500 | -500 | -500 | -500 |
| | C | 500 | 500 | 500 | 500 | 500 | 500 | 500 | 500 | 500 | 500 | 500 |
| | D | 1,500 | 1,500 | 1,500 | 1,500 | 1,500 | 1,500 | 1,500 | 1,500 | 1,500 | 1,500 | 1,500 |
| | E | -1,500 | -1,500 | -1,500 | -1,500 | -1,500 | -1,500 | -1,500 | -1,500 | -1,500 | -1,500 | -1,500 |
| | F | -500 | -500 | -500 | -500 | -500 | -500 | -500 | -500 | -500 | -500 | -500 |
| | G | 500 | 500 | 500 | 500 | 500 | 500 | 500 | 500 | 500 | 500 | 500 |
| | H | 1,500 | 1,500 | 1,500 | 1,500 | 1,500 | 1,500 | 1,500 | 1,500 | 1,500 | 1,500 | 1,500 |
| | I | -1,500 | -1,500 | -1,500 | -1,500 | -1,500 | -1,500 | -1,500 | -1,500 | -1,500 | -1,500 | -1,500 |
| | J | -500 | -500 | -500 | -500 | -500 | -500 | -500 | -500 | -500 | -500 | -500 |
| | K | 500 | 500 | 500 | 500 | 500 | 500 | 500 | 500 | 500 | 500 | 500 |
| | L | 1,500 | 1,500 | 1,500 | 1,500 | 1,500 | 1,500 | 1,500 | 1,500 | 1,500 | 1,500 | 1,500 |

FIG. 21B

TEy END POINT y COORDINATE TABLE

| | | \multicolumn{11}{c|}{DIFFRACTIVE REGION NUMBER} |
|---|---|---|---|---|---|---|---|---|---|---|---|---|
| | | a | b | c | d | e | f | g | h | i | j | k |
| ELEMENT REGION NUMBER | A | 995 | 996 | 997 | 998 | 999 | 1,000 | 1,001 | 1,002 | 1,003 | 1,004 | 1,005 |
| | B | 995 | 996 | 997 | 998 | 999 | 1,000 | 1,001 | 1,002 | 1,003 | 1,004 | 1,005 |
| | C | 995 | 996 | 997 | 998 | 999 | 1,000 | 1,001 | 1,002 | 1,003 | 1,004 | 1,005 |
| | D | 995 | 996 | 997 | 998 | 999 | 1,000 | 1,001 | 1,002 | 1,003 | 1,004 | 1,005 |
| | E | -5 | -4 | -3 | -2 | -1 | 0 | 1 | 2 | 3 | 4 | 5 |
| | F | -5 | -4 | -3 | -2 | -1 | 0 | 1 | 2 | 3 | 4 | 5 |
| | G | -5 | -4 | -3 | -2 | -1 | 0 | 1 | 2 | 3 | 4 | 5 |
| | H | -5 | -4 | -3 | -2 | -1 | 0 | 1 | 2 | 3 | 4 | 5 |
| | I | -1,005 | -1,004 | -1,003 | -1,002 | -1,001 | -1,000 | -999 | -998 | -997 | -996 | -995 |
| | J | -1,005 | -1,004 | -1,003 | -1,002 | -1,001 | -1,000 | -999 | -998 | -997 | -996 | -995 |
| | K | -1,005 | -1,004 | -1,003 | -1,002 | -1,001 | -1,000 | -999 | -998 | -997 | -996 | -995 |
| | L | -1,005 | -1,004 | -1,003 | -1,002 | -1,001 | -1,000 | -999 | -998 | -997 | -996 | -995 |

FIG. 21C

TEz END POINT z COORDINATE TABLE

| | | \multicolumn{11}{c|}{DIFFRACTIVE REGION NUMBER} |
|---|---|---|---|---|---|---|---|---|---|---|---|---|
| | | a | b | c | d | e | f | g | h | i | j | k |
| ELEMENT REGION NUMBER | A | 4,000 | 4,000 | 4,000 | 4,000 | 4,000 | 4,000 | 4,000 | 4,000 | 4,000 | 4,000 | 4,000 |
| | B | 4,000 | 4,000 | 4,000 | 4,000 | 4,000 | 4,000 | 4,000 | 4,000 | 4,000 | 4,000 | 4,000 |
| | C | 4,000 | 4,000 | 4,000 | 4,000 | 4,000 | 4,000 | 4,000 | 4,000 | 4,000 | 4,000 | 4,000 |
| | D | 4,000 | 4,000 | 4,000 | 4,000 | 4,000 | 4,000 | 4,000 | 4,000 | 4,000 | 4,000 | 4,000 |
| | E | 4,000 | 4,000 | 4,000 | 4,000 | 4,000 | 4,000 | 4,000 | 4,000 | 4,000 | 4,000 | 4,000 |
| | F | 4,000 | 4,000 | 4,000 | 4,000 | 4,000 | 4,000 | 4,000 | 4,000 | 4,000 | 4,000 | 4,000 |
| | G | 4,000 | 4,000 | 4,000 | 4,000 | 4,000 | 4,000 | 4,000 | 4,000 | 4,000 | 4,000 | 4,000 |
| | H | 4,000 | 4,000 | 4,000 | 4,000 | 4,000 | 4,000 | 4,000 | 4,000 | 4,000 | 4,000 | 4,000 |
| | I | 4,000 | 4,000 | 4,000 | 4,000 | 4,000 | 4,000 | 4,000 | 4,000 | 4,000 | 4,000 | 4,000 |
| | J | 4,000 | 4,000 | 4,000 | 4,000 | 4,000 | 4,000 | 4,000 | 4,000 | 4,000 | 4,000 | 4,000 |
| | K | 4,000 | 4,000 | 4,000 | 4,000 | 4,000 | 4,000 | 4,000 | 4,000 | 4,000 | 4,000 | 4,000 |
| | L | 4,000 | 4,000 | 4,000 | 4,000 | 4,000 | 4,000 | 4,000 | 4,000 | 4,000 | 4,000 | 4,000 |

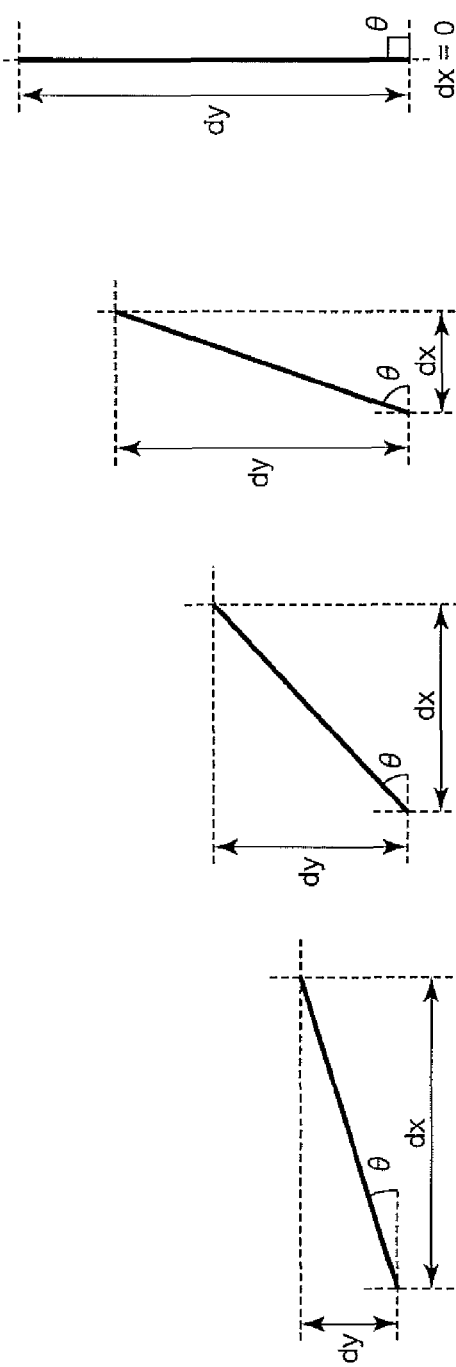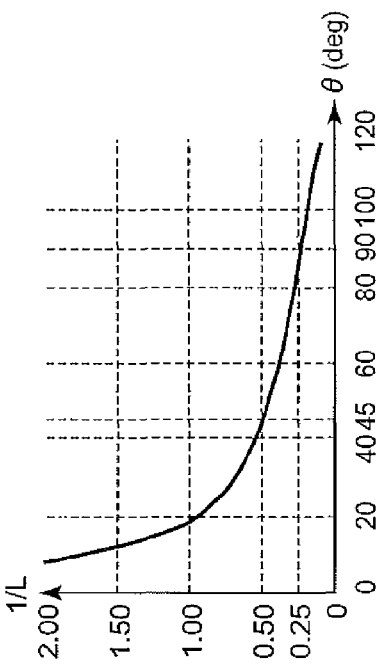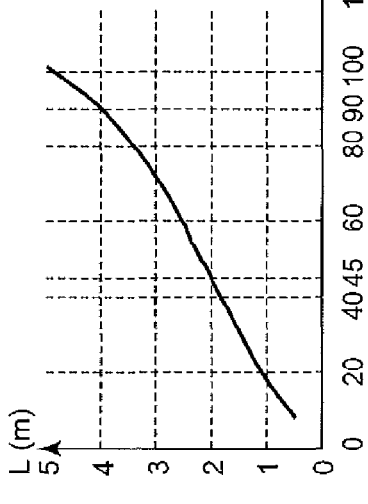

RANGE IMAGE SENSOR, RANGE IMAGE GENERATING APPARATUS, RANGE IMAGE DATA OBTAINING METHOD AND RANGE IMAGE GENERATING METHOD

CROSS-REFERENCE TO RELATED APPLICATION

This application claims the benefit of Japanese Patent Application 2010-187637, filed Aug. 24, 2010, the entire disclosure of which is incorporated by reference herein.

FIELD

This application relates generally to a range image sensor, a range image generating apparatus, a range image data obtaining method and a range image generating method.

BACKGROUND

Unexamined Japanese Patent Application KOKAI Publication No. 2006-153773 discloses a range image sensor which comprises a plurality of photosensitive units for generating electrical charge in accordance with the amount of light received, and an image generator for computing the distance to the object using the set of charges generated by the photosensitive units and generating a range image whose computed distance is the pixel value.

The range image sensor disclosed in Unexamined Japanese Patent Application KOKAI Publication No. 2006-153773 is a TOF (Time of Flight) sensor and thus requires special, expensive CMOS (Complementary Metal Oxide Semiconductor) sensors or MEMS (Micro Electro Mechanical Systems) scanners. Consequently, the range image sensor disclosed in Unexamined Japanese Patent Application KOKAI Publication No. 2006-153773 is expensive.

The present invention has been made in view of the above-explained circumstance, and it is an object of the present invention to provide an inexpensive range image sensor, range image generating apparatus, range image data obtaining method and range image generating method.

SUMMARY

In order to achieve the above object, the range image sensor according to a first aspect of the present invention comprises:

a parallel-light generating unit that, in a coordinate space defined by an x-axis, a y-axis and a z-axis, generates parallel light that advances in the z-axis direction;

a diffraction unit that includes a diffractive grating that changes a traveling direction of the generated parallel light such that
  (i) the generated parallel light is split into split light beams, and
  (ii) angles become predetermined angles on a predetermined projection plane intersecting the z-axis, each of the angles being formed by (a) the x-axis and (b) each of line segments determined by one of projected light spots formed by the split light beams;

an image pickup unit that picks up the projected light spots formed on an object by the split light beams outputted from the diffraction unit; and a distance determining unit that determines a plurality of distances to the projected light spots based on a tilting with respect to the x-axis of the line segments determined by the projected light spots picked up by the image pickup unit.

In order to achieve the above object, the range image data obtaining method according to a second aspect of the present invention comprises:

a parallel-light generating step that, in a coordinate space defined by an x-axis, a y-axis and a z-axis, generates parallel light that advances in the z-axis direction;

a diffraction step that changes a traveling direction of the generated parallel light such that
  (i) the generated parallel light is split into split light beams, and
  (ii) angles become predetermined angles on a predetermined projection plane intersecting the z-axis, each of the angles being formed by (a) the x-axis and (b) each of line segments determined by one of projected light spots formed by the split light beams;

an image pickup step that picks up the projected light spots formed on an object by the split light beams outputted by the diffraction step; and a distance determining step that determines a plurality of distances to the projected light spots based on a tilting with respect to the x-axis of the line segments determined by the projected light spots picked up in the image pickup step.

In order to achieve the above object, the range image generating apparatus according to a third aspect of the present invention comprises:

a parallel-light generating unit that, in a coordinate space defined by an x-axis, a y-axis and a z-axis, generates parallel light that advances in the z-axis direction;

a diffraction unit that includes a diffractive grating that changes a traveling direction of the generated parallel light such that
  (i) the generated parallel light is split into split light beams, and
  (ii) angles become predetermined angles on a predetermined projection plane intersecting the z-axis, each of the angles being formed by (a) the x-axis and (b) each of line segments determined by one of projected light spots formed by the split light beams;

an image pickup unit that picks up the projected light spots formed on an object by the split light beams outputted from the diffraction unit;

a distance determining unit that determines a plurality of distances to the projected light spots based on a tilting with respect to the x-axis of the line segments determined by the projected light spots picked up by the image pickup unit; and a range image generating unit that generates a range image having pixel values in accordance with the plurality of distances determined by the distance determining unit.

In order to achieve the above object, the range image generating method according to a fourth aspect of the present invention comprises:

a parallel-light generating step that, in a coordinate space defined by an x-axis, a y-axis and a z-axis, generates parallel light that advances in the z-axis direction;

a diffraction step that changes a traveling direction of the generated parallel light such that
  (i) the generated parallel light is split into split light beams, and
  (ii) angles become predetermined angles on a predetermined projection plane intersecting the z-axis, each of the angles being formed by (a) the x-axis and (b) each of line segments determined by one of projected light spots formed by the split light beams;

an image pickup step that picks up the projected light spots formed on an object by the split light beams outputted by the diffraction step;

a distance determining step that determines a plurality of distances to the projected light spots based on a tilting with respect to the x-axis of the line segments determined by the projected light spots picked up in the image pickup step; and a range image generating step that generates a range image having pixel values in accordance with the plurality of distances determined in the distance determining step.

BRIEF DESCRIPTION OF THE DRAWINGS

A more complete understanding of this application can be obtained when the following detailed description is considered in conjunction with the following drawings, in which:

FIG. 3A is a diagram for explaining multi-point divergence of incident beam by the diffractive optical element according to the first embodiment;

FIG. 3B is a diagram showing one example of the end points of the beams split by the diffractive optical element of the first embodiment;

FIG. 3C is a diagram showing one example of the composition of a repeated region possessed by the diffractive optical element of the first embodiment;

FIG. 4A is a table showing one example of the start points, end points, direction ratio and direction cosine of a diffractive optical element positioned on the negative side of the x-axis;

FIG. 4B is a table showing one example of the start points, end points, direction ratio and direction cosine of a diffractive optical element positioned on the positive side of the x-axis;

FIG. 6A is a diagram showing one example of a pair comprised of a first projected light spot and a second projected light spot projected on a projection plane distant from the diffractive optical element of the first embodiment by a distance "4 m";

FIG. 6B is a diagram showing one example of a pair comprised of a first projected light spot and a second projected light spot projected on a projection plane distant from the diffractive optical element of the first embodiment by a distance "3 m";

FIG. 6C is a diagram showing one example of a pair comprised of a first projected light spot and a second projected light spot projected on a projection plane distant from the diffractive optical element of the first embodiment by a distance "2 m";

FIG. 6D is a diagram showing one example of a pair comprised of a first projected light spot and a second projected light spot projected on a projection plane distant from the diffractive optical element of the first embodiment by a distance "1 m";

FIG. 6E is a graph showing one example of the relationship between the distance L to the projection plane from the diffractive optical element of the first embodiment and the value dx/dy of the line segment determined by the projected light spots projected on the projection plane;

FIG. 6F is a graph showing one example of the relationship between the inverse 1/L of the distance to the projection plane from the diffractive optical element of the first embodiment and the value dx/dy;

FIG. 10A is a diagram showing one example of the first projected light spot and the second projected light spot projected on the projection plane distant from the diffractive optical element of the second embodiment by a distance "1 m";

FIG. 10B is a diagram showing one example of the first projected light spot and the second projected light spot projected on the projection plane distant from the diffractive optical element of the second embodiment by a distance "2 m";

FIG. 10C is a diagram showing one example of the first projected light spot and the second projected light spot projected on the projection plane distant from the diffractive optical element of the second embodiment by a distance "3 m";

FIG. 10D is a diagram showing one example of the first projected light spot and the second projected light spot projected on the projection plane distant from the diffractive optical element of the second embodiment by a distance "4 m";

FIG. 19A is a diagram for explaining multi-point divergence of incident beam by the diffractive optical element according to the fifth embodiment;

FIG. 19B is a diagram showing one example of the end points of the beams split by the diffractive optical element of the fifth embodiment;

FIG. 19C is a table showing one example of the start points, end points, direction ratios and direction cosine of the diffractive optical element of the fifth embodiment;

FIG. 20A is a table showing one example of indexes identifying diffraction regions possessed by the diffractive optical element of the fifth embodiment;

FIG. 20B is a table showing one example of x coordinate values for the start points of the diffraction regions in the fifth embodiment;

FIG. 20C is a table showing one example of y coordinate values for the start points of the diffraction regions in the fifth embodiment;

FIG. 20D is a table showing one example of z coordinate values for the start points of the diffraction regions in the fifth embodiment;

FIG. 21A is a table showing one example of x coordinate values for the end points of the diffraction regions in the fifth embodiment;

FIG. 21B is a table showing one example of y coordinate values for the end points of the diffraction regions in the fifth embodiment;

FIG. 21C is a table showing one example of z coordinate values for the end points of the diffraction regions in the fifth embodiment;

FIG. 22A is a diagram showing one example of the projected light spot projected on a projection plane distant from the diffractive optical element of the fifth embodiment by a distance "1 m";

FIG. 22B is a diagram showing one example of the projected light spot projected on a projection plane distant from the diffractive optical element of the fifth embodiment by a distance "2 m";

FIG. 22C is a diagram showing one example of the projected light spot projected on a projection plane distant from the diffractive optical element of the fifth embodiment by a distance "3 m";

FIG. 22D is a diagram showing one example of the projected light spot projected on a projection plane distant from the diffractive optical element of the fifth embodiment by a distance "4 m";

FIG. 22E is a graph showing one example of the relationship between the distance L from the diffractive optical element to the projection plane and the angle θ formed by the x-axis and the projected light spot projected on the projection plane according to the fifth embodiment;

FIG. 22F is a graph showing one example of the relationship between the inverse 1/L of the distance from the diffractive optical element to the projection plane and the angle θ according to the fifth embodiment;

DETAILED DESCRIPTION

The best mode of the present invention will be explained below with reference to the accompanying drawings.

First Embodiment

Figure 1:
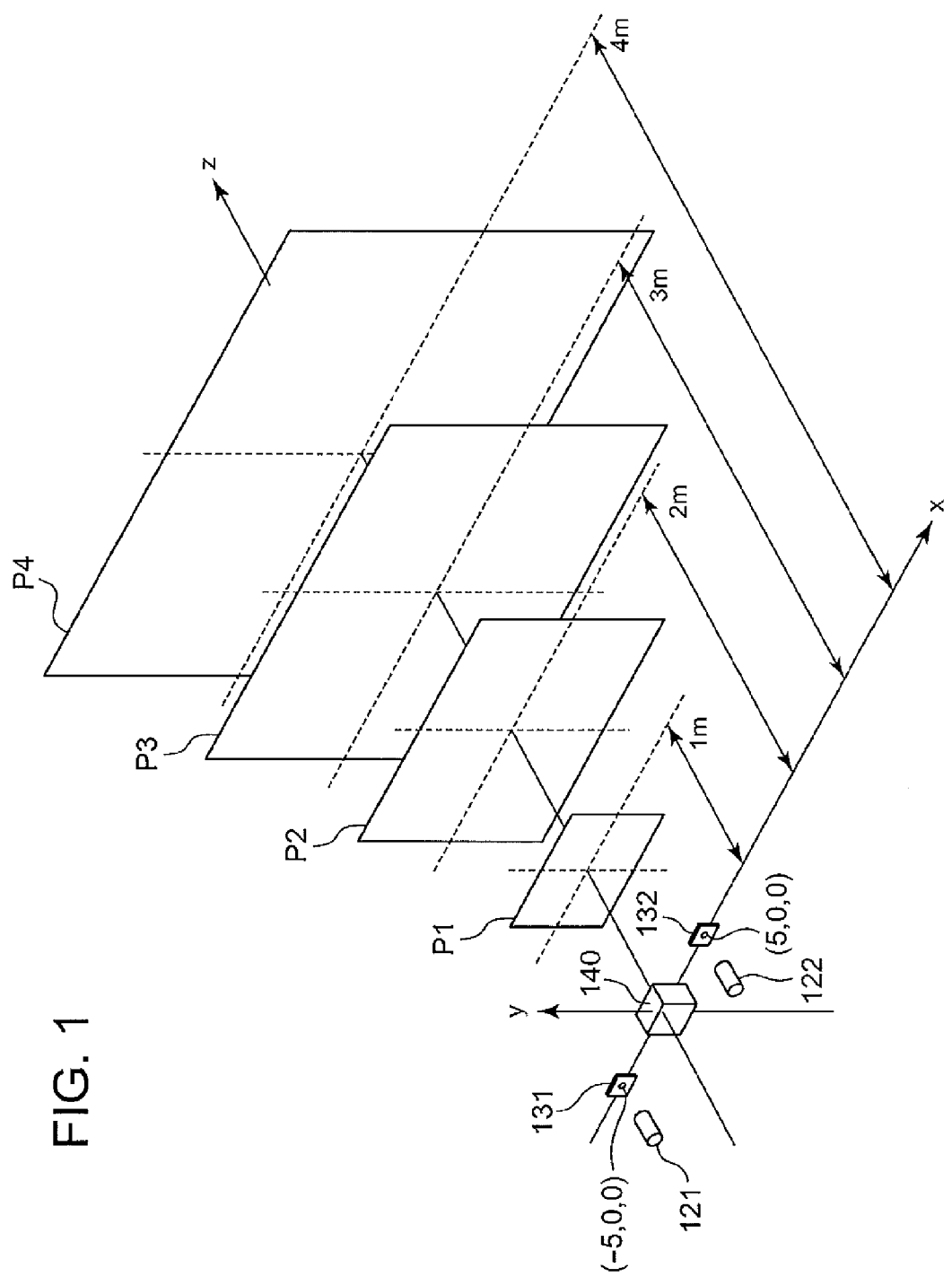
FIG. 1 shows one example of a projection plane on which the range image sensor according to a first embodiment projects a spot beam.

A range image sensor 100 according to a first embodiment of the present invention outputs, in an xyz space shown in FIG. 1, a plurality of spot beams in which mutually differing a plurality of projected light spots are formed on projection planes P1 through P4 orthogonal to the z-axis and having differing distances (i.e., z coordinate values) from the origin to an object. Next, the range image sensor 100 measures (determines) a plurality of distances to a point on the object formed by the projected light spots, on the basis of a plurality of projected light spots formed on the object by these spot beams. The projected light spot means a region where brightness is higher by a predetermined value (i.e., lighted up brighter) than a peripheral region by a predetermined distance from the projected light spot.

Figure 2A:
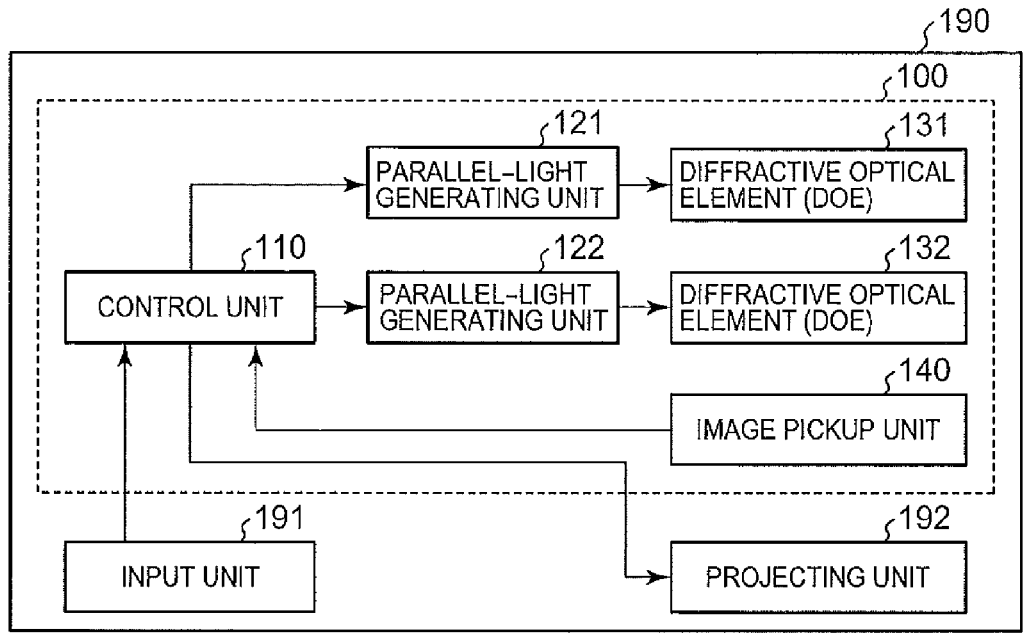
FIG. 2A is a diagram showing one example of the configuration of a projector having the range image sensor according to the first embodiment.

The range image sensor 100 is installed in a projector 190 such as that shown in FIG. 2A and is provided with a control unit 110, parallel-light generating units 121 and 122, diffractive optical elements (hereafter, DOE) 131 and 132 and an image pickup unit 140. The projector 190 includes, in addition to the range image sensor 100, an input unit 191 that inputs an operation signal in accordance with an operation given by a user of the projector 190, and a projecting unit 192 which is controlled by the control unit 110 and which projects an image on a screen. The parallel-light generating units 121 and 122, the DOE 131 and 132 and the image pickup unit 140 will be explained prior to an explanation of the control unit 110.

The parallel-light generating units 121 and 122 are comprised for example of a laser diode (hereafter, LD) with a collimator lens. The parallel-light generating units 121 and 122 output, the collimated spot beams having roughly equivalent wavelengths and traveling in the z-axis direction, which are incident on the DOE 131 and 132, respectively.

As shown in FIG. 1, the DOE 131 is located at a position whose center coordinate on the incidence plane on which the spot beams are incident is (−5, 0, 0), and the DOE 132 is located at a position whose center coordinate on the incidence plane is (+5, 0, 0). The DOE 131 and 132 have multi-point divergence diffractive gratings. The DOE 131 has a diffractive grating pattern that splits the single spot beam traveling in the z-axis direction generated by the parallel-light generating unit 121 into twelve spot beams, as shown in FIG. 3A, and the DOE 132 has a similar diffractive grating pattern. Consequently, the twelve spot beams (hereafter called split beams) split by the DOE 131 form twelve projected light spots EA1 to EL1 on a projection plane P4 positioned at a distance of "4 meters (hereafter abbreviated "m")" in the z direction from the DOE 131, as shown in FIG. 3B. In addition, the twelve split beams outputted from the DOE 132 similarly form twelve projected light spots EA2 through EL2 on the projection plane P4.

As shown in FIG. 3C, a plurality of repeated regions RR1 are formed on the incidence plane of the DOE 131 in a tiled manner (i.e., so as to adjoin one another). The repeated regions RR1 are arranged at a pitch that is sufficiently smaller than the diameter of laser beam normally outputted. As shown in FIG. 3C, twelve element regions A1 to L1 are arranged at the repeated region RR1 in a tiled manner. As shown in FIG. 4A, twelve kinds of diffractive gratings having different directions of split beam outputted when laser beam going advance in the z-axis direction enters thereto are formed at respective element regions A1 to L1 configuring the repeated region RR1. The table in FIG. 4A is expressed with the point where the spot beam is incident as the start point, the point where the projected light spot is formed on the projection plane P4 as the end point and the traveling direction of the outputted light from the start point toward the end point as the direction cosine.

When a start point is at a position expressed the coordinates (−5, 0, 0), as shown in FIG. 4A, the element region A1 changes the traveling direction of the outputted spot beam to a direction toward the end point EA1 expressed by the coordinates (−1500, 995, 4000). Similarly, when a start point is a position with the coordinates (−5, 0, 0), the element region B1 changes the traveling direction of the outputted spot beam to a direction toward the end point EB1 expressed by the coordinates (−500, 995, 4000). Furthermore, the element regions C1 and D1 change the traveling direction of the spot beam to a direction toward end points EC1 and ED1, which correspond to the points shifted with x coordinate values of the end point EB1 by "1000" and "2000", respectively.

In addition, the element regions E1 to H1 change the traveling direction of the spot beam to a direction toward the end points EE1 to EH1, which correspond to the points shifted with the y coordinate value of the end points EA1 to ED1 by "−1000", and the element regions I1 to L1 change the traveling direction of the spot beam to a direction toward the end points EH to EL1, which correspond to the points shifted with the y coordinate value of the end points EA1 to ED1 by "−2000".

The number of types of element regions the DOE 131 possesses is not limited to twelve. In addition, the diffractive gratings formed at the element regions may be comprised of a plurality of grooves in the binary format (i.e., with substantially the same depth) provided on the surface of a transparent substrate comprising the DOE 131, or may be comprised with a plurality of grooves of differing depths.

Figure 5A:
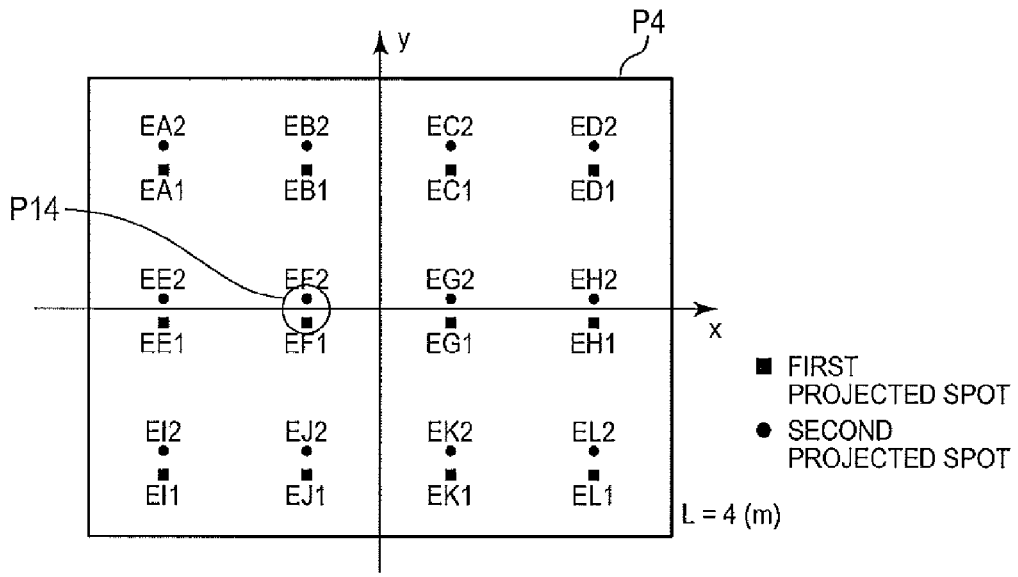
FIG. 5A is a diagram showing one example of the projected light spot projected on a projection plane distant from the diffractive optical element of the first embodiment by a distance "4 m"
Figure 5B:
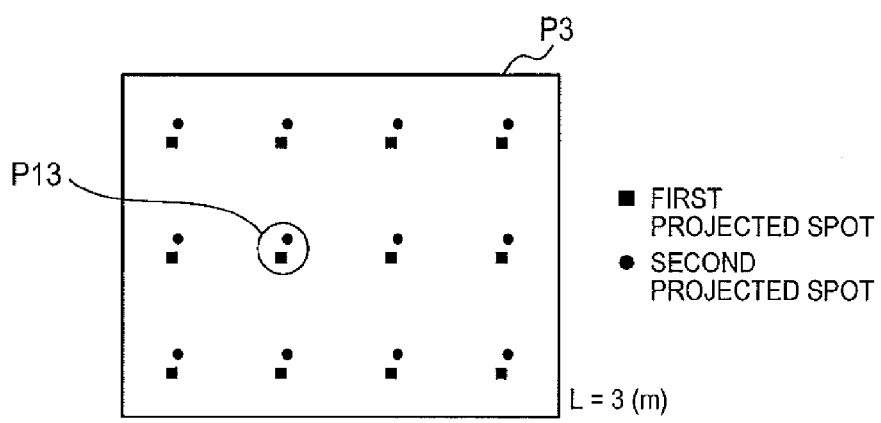
FIG. 5B is a diagram showing one example of the projected light spot projected on a projection plane distant from the diffractive optical element of the first embodiment by a distance "3 m"
Figure 5C:
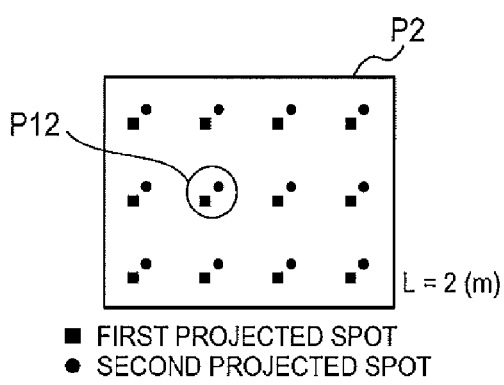
FIG. 5C is a diagram showing one example of the projected light spot projected on a projection plane distant from the diffractive optical element of the first embodiment by a distance "2 m"
Figure 5D:
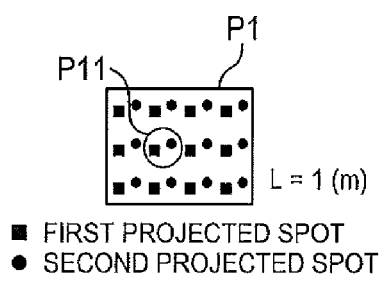
FIG. 5D is a diagram showing one example of the projected light spot projected on a projection plane distant from the diffractive optical element of the first embodiment by a distance "1 m"

As shown on the table in FIG. 4B and in FIG. 5A, the element regions A2 to L2 of the DOE 132 are such that when a spot beam traveling in the z-axis direction is input at a start position expressed by coordinates (+5, 0, 0), the traveling directions of the outputted spot beams are directions toward the points EA2 to EL2, which correspond to the points shifted with a y coordinate value of the end points EA1 to EL1 formed on the projection plane P4 by "+10".

For example, when the projected light spot (hereafter called the first projected light spot) of the split beam (hereafter called the first split beam) outputted from the DOE 131 and a spot that is the projected light spot (hereafter called the second projected light spot) of the split beam (hereafter called the second split beam) outputted from the DOE 132, which is positioned on the position direction of the y-axis by "+10" from the first projected light spot are paired, such as the end points EA1 and EA2, and EL1 and EL2, the line segment whose ends are the first projected light spot and the second projected light spot comprising the pair is orthogonal to the x-axis.

Consequently, as shown in FIGS. 5A to 5D and FIGS. 6A to 6D, as the distance between the projection plane and the start point declines from "4 m", the angle formed by the x-axis and the line segment made by linking the first projected light spot and the second projected light spot comprising a pair formed on the projection plane declines from "90°" to "0°". Consequently, the ratio of the length dx of the line segment in the x-axis direction (horizontal direction) to the length dy of the line segment in the y-axis direction (horizontal direction) (hereafter called the value dx/dy) is inversely proportional to the distance L from the start point to the projected light spot, as shown in FIG. 6E, and is directly proportional to the reciprocal of the distance L from the start point to the projected light spot, as shown in FIG. 6F.

The image pickup unit 140 in FIG. 2A is composed for example of a digital camera, and as shown in FIG. 1, is positioned such that the optical axis substantially matches the z-axis, the main scanning direction is parallel to the x-axis and the auxiliary scanning direction is parallel to the y-axis. When the first split beam and the second split beam are outputted toward the object from the DOE 131 and the DOE 132, the image pickup unit 140 is controlled by the control unit 110 and images the first projected light spot and the second projected light spot formed on the object by the first split beam and the second split beam.

Figure 2B:
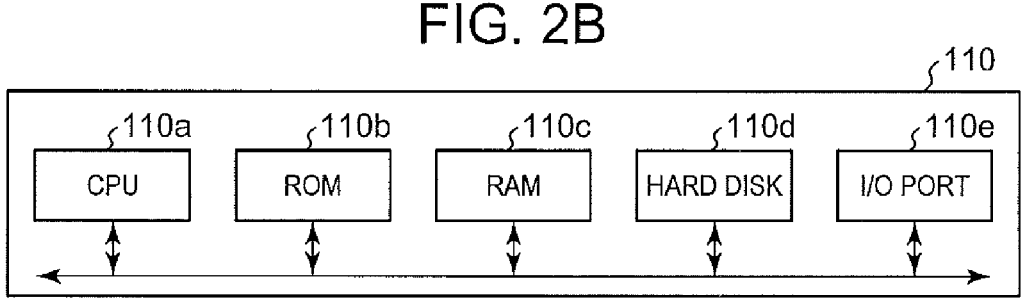
FIG. 2B is a hardware configuration diagram showing one example of the configuration of a control unit according to the first embodiment.

The control unit 110 shown in FIG. 2A includes, for example, as shown in FIG. 2B, a CPU (Central Processing Unit) 110a, a ROM (Read Only Memory) 110b, a RAM (Random Access Memory) 110c, a hard disk 110d, and an input/output port (hereinafter, called the I/O port) 110e.

The CPU 110a accomplishes entire control of the projector 190 including the range image sensor 100 by executing a software process in accordance with a program stored on the ROM 110b or the hard disk 110d. The RAM 110c temporarily stores information (data) as a process object during execution of the program by the CPU 110a.

The hard disk 110d stores image data representing an image, a program, and various data tables looked up when the program is run. The data tables stored by the hard disk 110d include a distance table shown in FIG. 6F which is storing plural pieces of information associated with information representing a dx/dy value of a projected spot and information representing an inverse number 1/L of a distance from the start point to the projected light spot. The I/O port 110e exchanges data with each unit connected to the control unit 110.

Figure 2C:
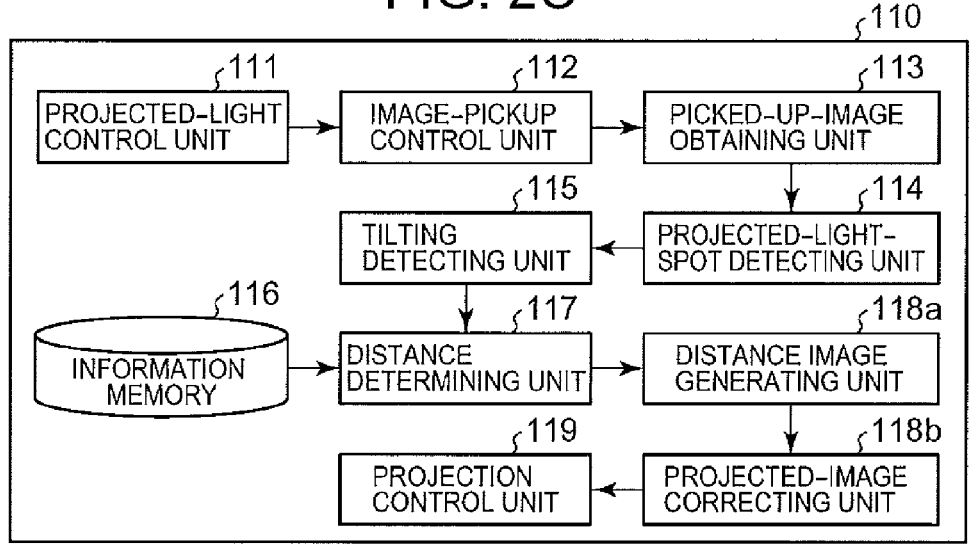
FIG. 2C is a functional block diagram showing one example of the functions possessed by the control unit of the first embodiment.
Figure 7:
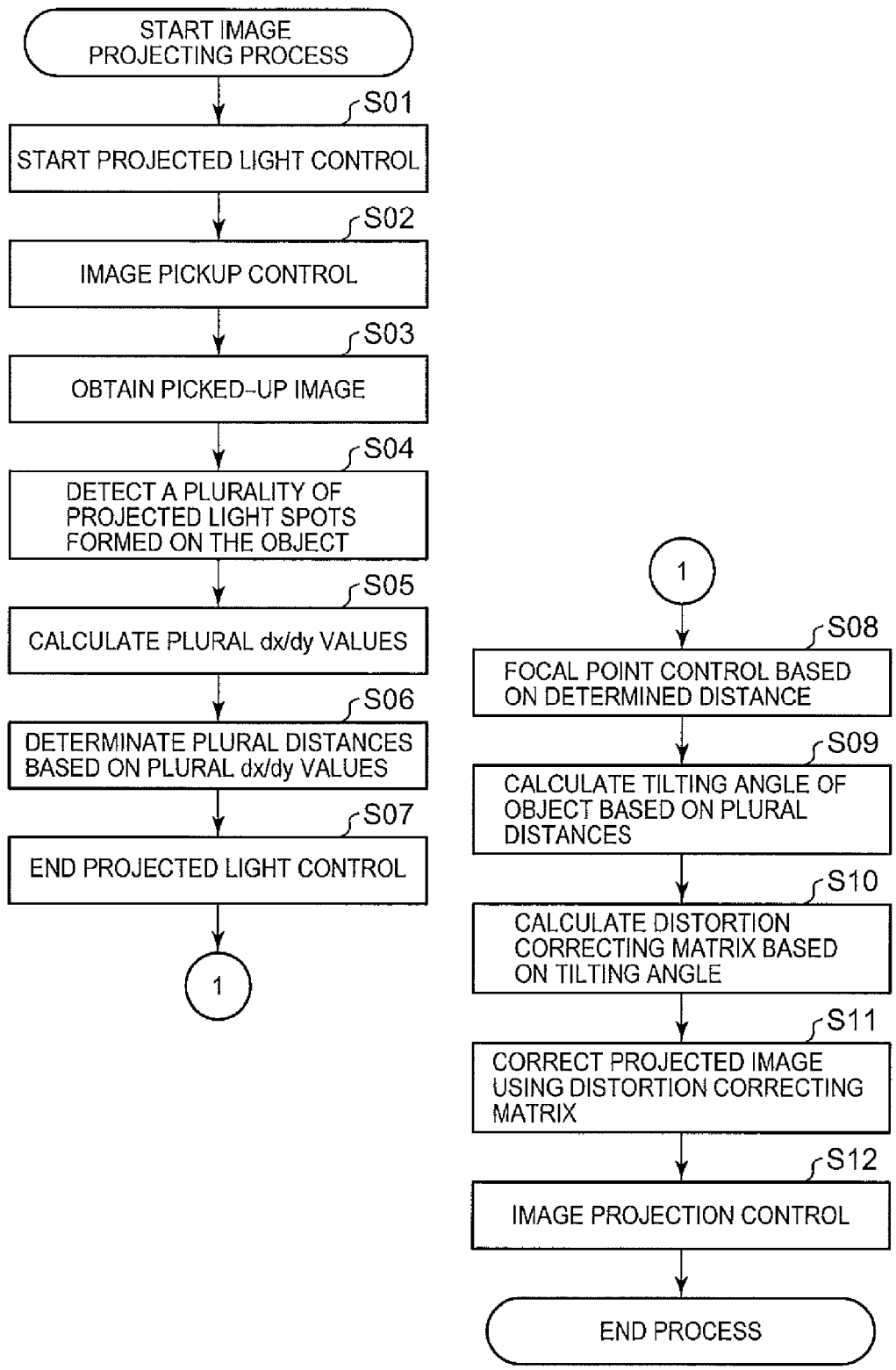
FIG. 7 is a flowchart showing one example of the image projection process executed by the control unit possessed by the range image sensor of the first embodiment.

The control unit 110 executes an image projecting process shown in FIG. 7 using the hardware shown in FIG. 2B, thereby functioning as, as shown in FIG. 2C, a projected-light control unit 111, an image-pickup control unit 112, a picked-up-image obtaining unit 113, a projected-light-spot detecting unit 114, a tilting detecting unit 115, an information memory unit 116, a distance determining unit 117, a range image generating unit 118a, a projected-image correcting unit 118b and a projection control unit 119.

When the image projection process in FIG. 7 is started, the projected-light control unit 111 of FIG. 2C starts projection control to project the twelve first split beams and the twelve second split beams at the object by causing the parallel-light generating units 121 and 122 to generate parallel light to be incident on the DOE 131 and 132 respectively, of FIG. 2A (step S01). Next, the image-pickup control unit 112 of FIG. 2C controls the image pickup unit 140 of FIG. 2A so as to pick up the twelve first projected light spots and the twelve second projected light spots formed on the object (step S02). Following this, the picked-up-image obtaining unit 113 obtains the picked-up image from the image pickup unit 140 (step S03).

Next, the projected-light-spot detecting unit 114 detects the twelve first projected light spots and the twelve second projected light spots displayed on the picked-up image on the basis of the brightness of the pixel value comprising the picked-up image (step S04). Next, the tilting detecting unit 115 acquires twelve pairs comprised of first projected light spots and second projected light spots whose mutual distances in the picked-up image are less than a predetermined value, and calculates the value dx/dy for the twelve line segments determined by the first projected light spots and second projected light spots comprising the acquired pairs (step S05).

Next, for the information showing the twelve values dx/dy calculated in step S05, the distance determining unit 117 searches information indicating the reciprocal of the distance corresponding to each from the above-described distance table where the information memory 116 stores such. Furthermore, the distance determining unit 117 determines (measures) the distance to each of the twelve points on the line segments determined by the projected light spots formed on the object, by calculating the reciprocal of the value expressed by the searched information (step S06). The range image generating unit 118a generates a range image with the twelve distances that were determined as the pixel value. Following this, the projected-light control unit 111 ends projection control (step S07).

Next, the projection control unit 119 accomplishes focus control to control the projecting unit 192 of FIG. 2A so as to align the focal point with the screen that is the object on the basis of the distance to the point positioned most in the center out of the distances to the twelve points on the object that were determined (measured) in step S06 (step S08). Following this, the projected-image correcting unit 118b calculates the tilting (slope) angles of the screen with respect to the optical axis of the projecting unit 192 on the basis of the distances to the determined twelve points (step S09). Specifically, the tilting angles of the screen calculated in step S09 include the angle formed by the horizontal direction of the screen and the optical axis of the projecting unit 192, and the angle formed by the vertical direction of the screen and the optical axis of the projecting unit 192.

Following this, the projected-image correcting unit 118b calculates a distortion correction matrix that cancels distortion of the image projected on the screen, using the tilting angles calculated in step S09 (step S10). As a specific example, the projected-image correcting unit 118b calculates a correction matrix for accomplishing trapezoidal correction, such as disclosed in U.S. Pat. No. 4,380,557. Next, the projected-image correcting unit 118b corrects the projected image projected on the screen using the correction matrix calculated in step S10 (step S11). Next, the projection control unit 119 accomplishes projection control to project onto the screen the corrected projection image (step S12) and then ends execution of the image projection process.

According to the above-explained configuration, the range image sensor 100 can determine the distances to a plurality of points formed by projected light spots on the object on the basis of the tilting to the x-axis of line segments determined (demarcated) by a plurality of projected light spots formed on the object by a plurality of split beams outputted from the DOE 131 and the DOE 132. Accordingly, the range image sensor 100 needs no CMOS (Complementary Metal Oxide Semiconductor) sensor or an MEMS (Micro Electro Mechanical Systems) scanner like a TOF (Time of Flight) sensor that is special and expensive. Therefore, even though the range image sensor 100 is small in size and inexpensive, the range image sensor 100 can measure respective distances to the plurality of points on the object and can generate range images.

Moreover, according to the above-explained configuration, the DOE 131 and the DOE 132 split the spot beams generated by the parallel-light generating units 121 and 122, respectively, into a plurality of split beams so it is possible to output a plurality of spot beams on the object without adding to the number of parallel-light generating units 121 and 122. Consequently, the range image sensor 100 can determine the distances to a plurality of points on the object without being large in size and expensive.

First Modified Example of First Embodiment

In the present embodiment, the explanation was such that range image sensor 100 is provided with two types of DOE 131 and 132 having the optical properties shown in FIGS. 4A and 4B, and the DOE 131 and 132 respectively split the spot beams generated by parallel-light generating units 121 and 122 so as to form a first projected light spot and a second projected light spot as shown in FIG. 5A. However, a composition may be utilized in which the DOE 131 and 132 with which the range image sensor 100 is equipped have the same optical properties (i.e., are the same type), and the incident angle with which the parallel-light generating unit 121 causes the spot beam to be incident on the DOE 131 and the incident angle with which the parallel-light generating unit 122 causes the spot beam to be incident on the DOE 132 differ so that the first projected light spot and the second projected light spot are formed as shown in FIGS. 5A to 5D.

Second Embodiment

Figure 8A:
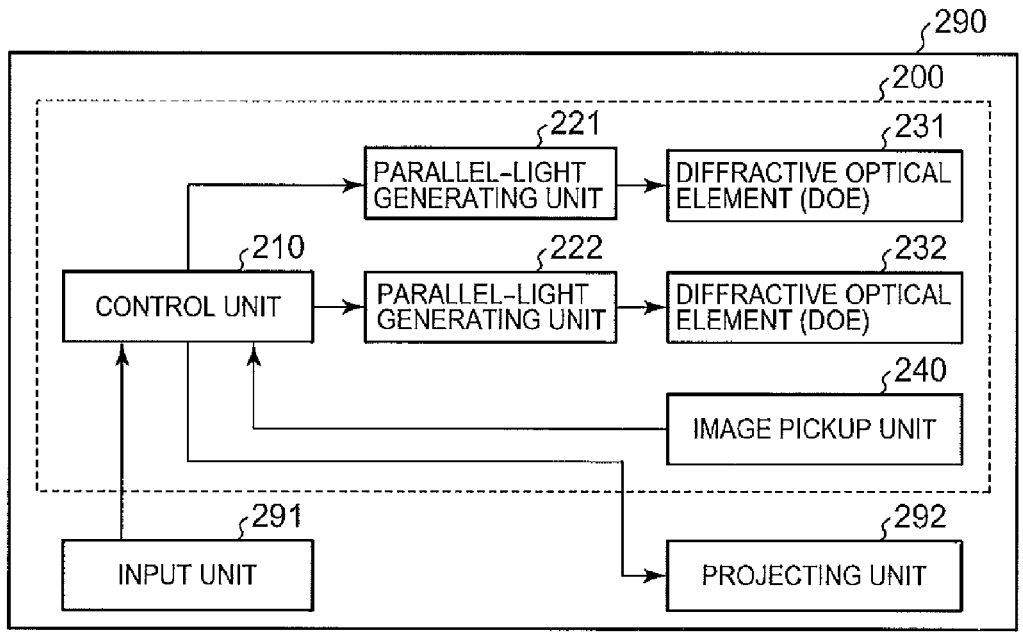
FIG. 8A is a diagram showing one example of the configuration of a projector having a range image sensor according to a second embodiment.

Next, a second embodiment will be explained. The range image sensor 200 according to the second embodiment of the present invention, similar to the first embodiment, is installed in a projector 290 as shown in FIG. 8A and is provided with a control unit 210, parallel-light generating units 221 and 222, DOE 231 and 232, and an image pickup unit 240, and the projector 290 is equipped with an input unit 291 and a projecting unit 292. Explanation is omitted for compositions in common with the first embodiment.

Figure 9A:
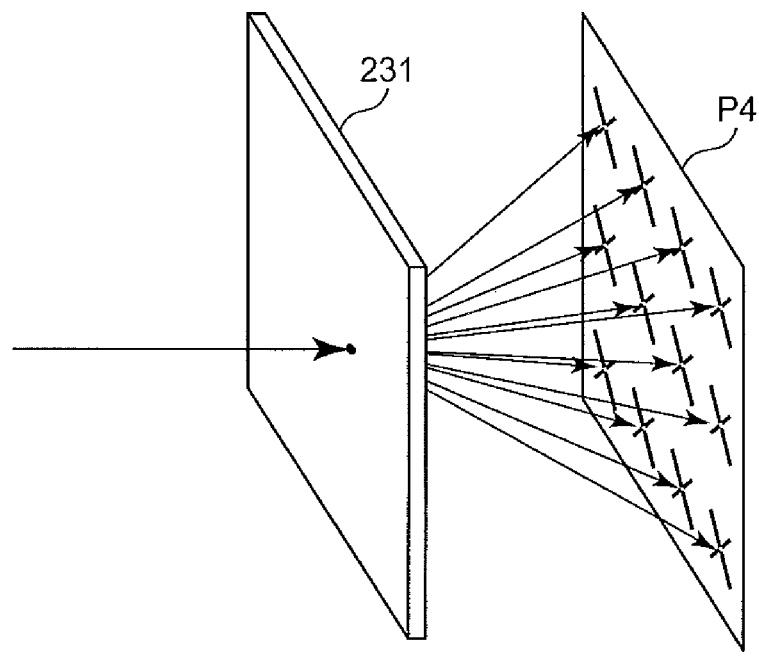
FIG. 9A is a diagram for explaining multi-point divergence of incident beam by the diffractive optical element according to the second embodiment.
Figure 9B:
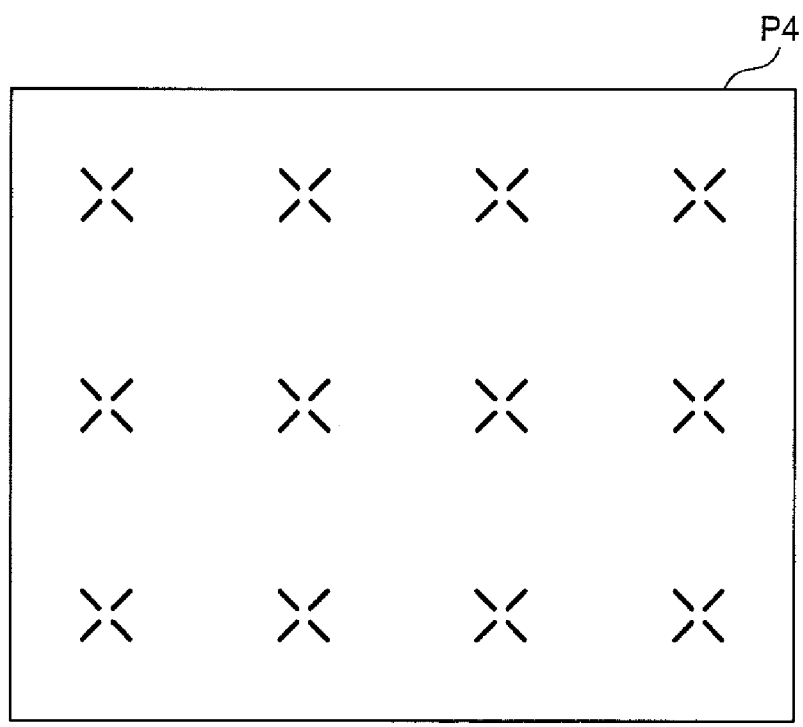
FIG. 9B shows one example of predetermined marks drawn by the projected light spots formed by the beams split by the diffractive optical element of the second embodiment.

As shown in FIGS. 9A and 9B, the DOE 231 splits a single spot beam into 48 flat beams (hereafter called split flat beams), and the projected light spots formed on the projection plane P4 by the 48 split flat beams change the traveling direction of one incident spot beam so as to depict twelve predetermined marks.

The flat beams are laser beams having a flat plane and are classified as a first flat beam in which the flat plane makes an angle of "45°" with the positive direction of the x-axis, a second flat beam that makes an angle of "135°", a third flat beam that makes an angle of "225°" and a fourth flat beam that makes an angle of "315°". For example, as shown in FIG. 10A, the marks of the projected light spot are depicted by a projected light spot in the shape of four line segments having substantially identical lengths formed by one first flat beam through fourth flat beam, respectively, and the point where extensions of the four line segments mutually intersect substantially orthogonally indicates the end point PE1 of the line segments used in determining distance.

The mark of the projected light spot may be an arbitrary shape, and for example, may indicate a circle with the center at the end point PE1 of the line segment. According to the above-explained configuration, for example even when the parallel level between the x-axis and the main scanning direction of the image pickup unit 240 is low, the shape of the projected light spot expressed on the picked-up image remains a circular shape and does not change, so the range image sensor 100 can detect the end point PE1 with good accuracy.

The DOE 232, like the DOE 231, splits a single spot beam into 48 split flat beams and also changes the traveling direction of the incident spot beam so that the projected light spots formed on the projection plane P4 by the 48 split flat beams depict twelve predetermined marks. In addition, as shown in FIG. 10D, the DOE 232 changes the traveling direction of the incident spot beam so that the positions of the twelve marks depicted by the outputted beam become positions shifted in the y coordinate value by "+10" from the positions depicted by the marks by the split flat beams outputted by the DOE 231. The four projected light spots formed by the first flat beam through the fourth flat beam outputted from the DOE 231 and comprising the same marks, respectively, are called the first projected light spot, and the four projected light spots formed by the first flat beam through the fourth flat beam outputted from the DOE 232 and comprising the same marks, respectively, are called the second projected light spot.

For this reason, as shown in FIGS. 10A to 10D and FIGS. 11A to 11D, as the distance between the projection plane and the start point increases from "1 m" to "4 m", the angle between the x-axis and a line segment connecting the end point PE1 indicated by the mark depicted by the first projected light spot and the end point PE2 indicated by the mark depicted by the second projected light spot comprising a pair formed on the projection plane increases from "0°" to "90°".

Similar to the first embodiment, the control unit 210 of FIG. 8A executes the image projection process of FIG. 7 and through this functions as a projected-light control unit 211, an image-pickup control unit 212, a picked-up-image obtaining unit 213, a projected-light-spot detecting unit 214, a tilting detecting unit 215, an information memory unit 216, a distance determining unit 217, a range image generating unit 218a, a projected-image correcting unit 218b and a projection control unit 219.

The tilting detecting unit 215 acquires twelve pairs by a method such as pairing the first projected light spots and second projected light spots such that the distance between the indicated end points PE1 and PE2, respectively, are less than a predetermined value in the picked-up image, out of the twelve first projected light spots and the twelve second projected light spots detected by the projected-light-spot detecting unit 214, and calculates the value dx/dy for the twelve line segments defined by the end point PE1 indicated by the first projected light spot and the end point PE2 indicated by the second projected light spot comprising the acquired pair.

For example, as in the first embodiment, when the distance is determined on the basis of the tilting of the line segment connecting the point-shaped first projected light spot and second projected light spot, if the view angle of the image pickup unit 240 of FIG. 8A is constant, to the extent that the distance L to the image pickup unit 240 increases (i.e., to the extent that the projection plane becomes farther away), the first projected light spot and the second projected light spot are displayed smaller in the picked-up image and the distance between the first projected light spot and the second projected light spot is displayed shorter, as shown in FIGS. 12A to 12D. In contrast, the mark in the second embodiment becomes larger along with the distance. Hence, according to the above-explained configuration, the tilting detecting unit 215 can detect a predetermined mark from the picked-up image with high accuracy. In addition, the tilting detecting unit 215 detects the line segments determined by the end points indicated by the marks, so it is possible to detect the line segment with good accuracy compared to the case in which the distance is determined on the basis of the tilting of the line segment connecting the point-shaped first projected light spot and second projected light spot as in the first embodiment. Accordingly, the range image sensor 200 can determine the distance with good accuracy. In addition, according to the above-explained configuration the tilting detecting unit 215 can detect the line segment with good accuracy even in cases in which there is a spot, blurriness or noise in the picked-up image, and hence the range image sensor 200 can detect the distance with good accuracy.

Third Embodiment

Figure 13A:
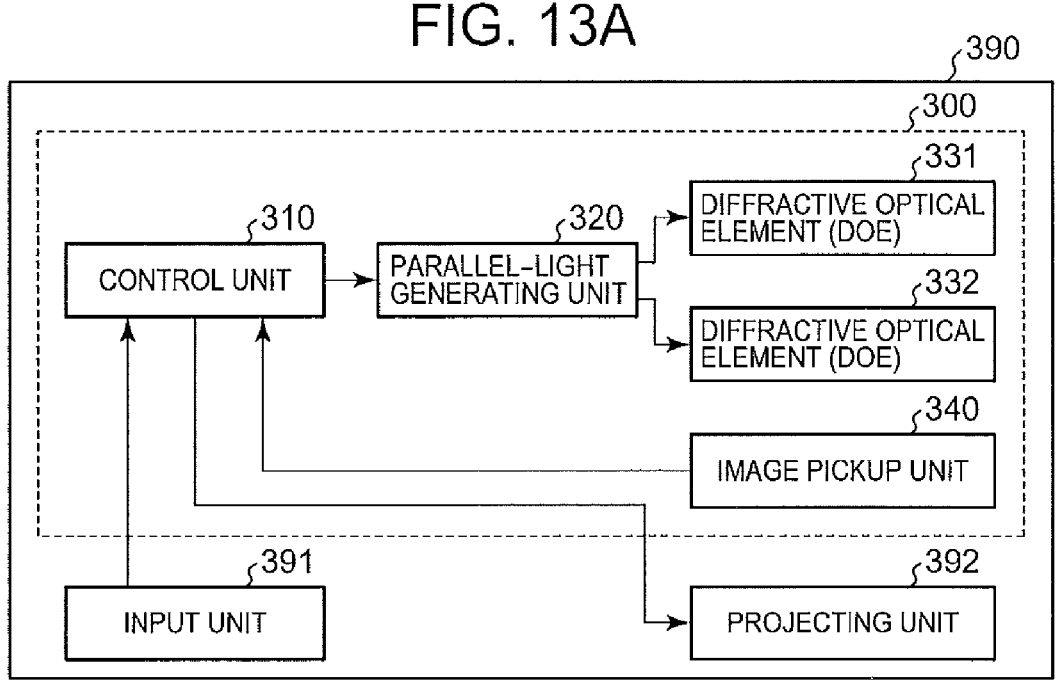
FIG. 13A is a diagram showing one example of the composition of a projector having the range image sensor according to a third embodiment.

Next, a third embodiment will be explained. A range image sensor 300 according to the third embodiment of the present invention is installed in a projector 390 as shown in FIG. 13A, similar to the first embodiment, and is equipped with a control unit 310, DOE 331 and 332, an image pickup unit 340 and a single parallel-light generating unit 320, and the projector 390 is equipped with an input unit 391 and a projecting unit 392. Explanation is omitted for compositions in common with the first embodiment.

Figure 13B:
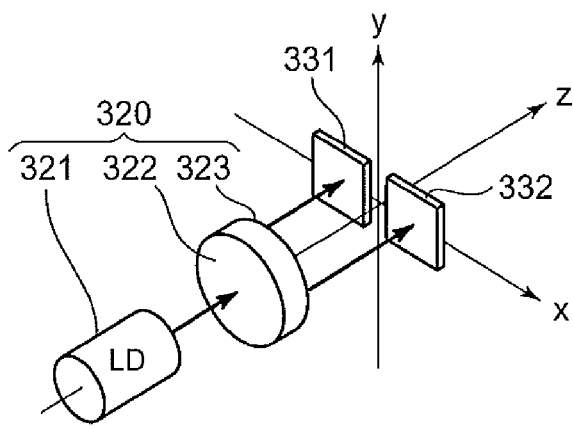
FIG. 13B is a perspective view showing one example of a parallel-light generating unit according to the third embodiment.
Figure 13C:
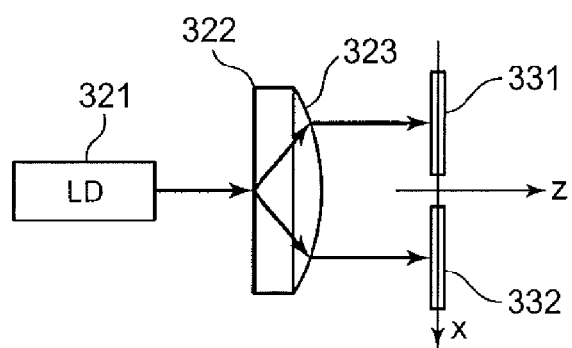
FIG. 13C is a top view showing one example of the parallel-light generating unit of the third embodiment.

The parallel-light generating unit 320 comprises an LD 321 that generates light and outputs a spot beam, a bifurcating DOE 322 on which is formed a diffractive grating that splits the spot beam incident from the LD 321 into a first spot beam and a second spot beam, and a flat convex lens 323 that after converting the first spot beam and the second spot beam outputted from the bifurcating DOE 322 into parallel beams traveling in the direction of the z-axis causes these to be incident on the DOE 331 and the DOE 332, respectively, as shown in FIGS. 13B and 13C.

According to the above-explained configuration, for example compared to the range image sensor 100 of the first embodiment and the range image sensor 200 of the second embodiment having two laser diodes (i.e., LD), the range image sensor 300 is more compact, lighter in weight and less expensive.

Fourth Embodiment

Next, a fourth embodiment will be explained. A range image sensor according to the fourth embodiment of the present invention is provided with a single parallel-light generating unit 420, the same as the third embodiment. Explanation is omitted for compositions in common with the third embodiment.

Figure 14A:
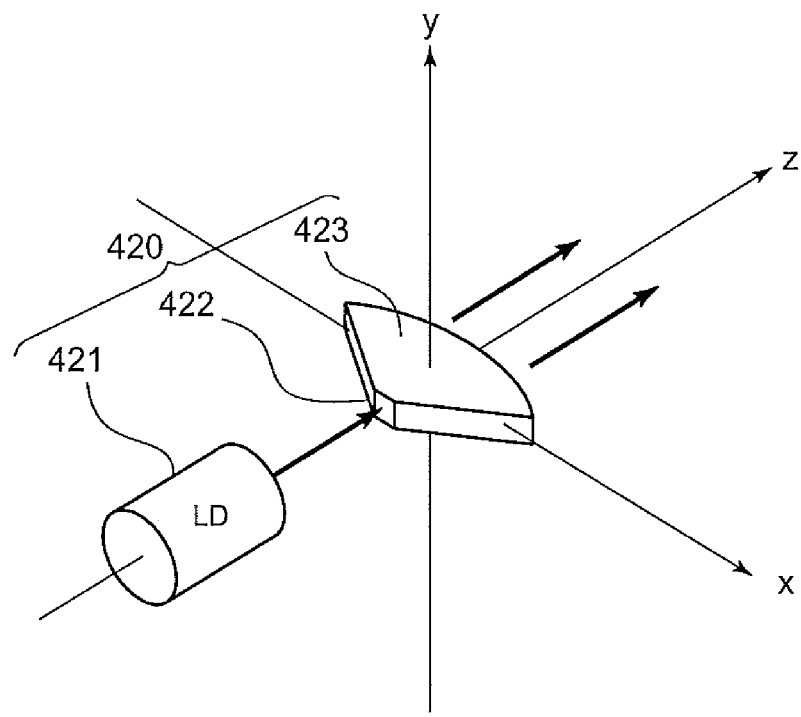
FIG. 14A is a perspective view showing one example of a parallel-light generating unit according to a fourth embodiment.
Figure 14B:
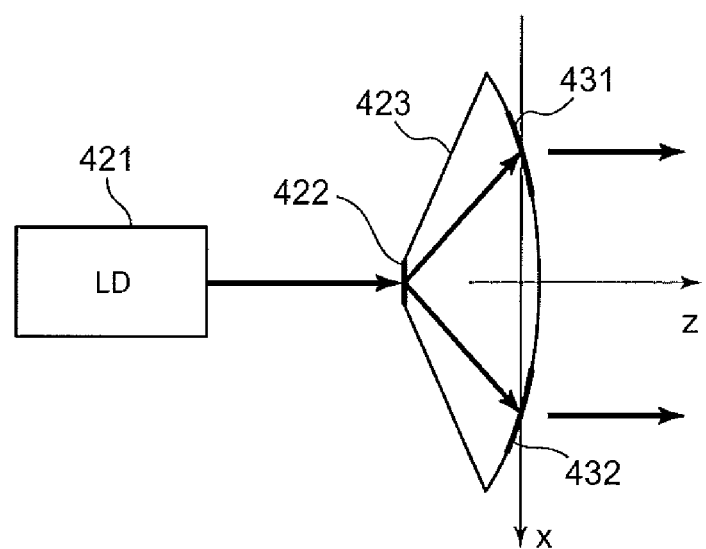
FIG. 14B is a top view showing one example of the parallel-light generating unit of the fourth embodiment.

As shown in FIGS. 14A and 14B, the parallel-light generating unit 420 comprises an LD 421 that generates light and outputs a spot beam, a bifurcating DOE 422 on which is formed a diffractive grating that splits the spot beam incident from the LD 421 into a first spot beam and a second spot beam, a flat convex lens 423 that converts the first spot beam and the second spot beam outputted from the bifurcating DOE 422 into parallel beams traveling in the direction of the z-axis, and DOE 431 and DOE 432 comprising groove-shaped diffractive gratings formed on the surface of the flat convex lens 423.

According to the above-explained configuration, the DOE 431 and the DOE 432 are formed on the flat convex lens 423, so for example compared to the case in which the flat convex lens 323, the DOE 331 and the DOE 332 are separate components, as in the third embodiment, the relative positioning accuracy of the flat convex lens 323, the DOE 331 and the DOE 332 is improved. Consequently, for example deviation in the incident angle of the parallel beams outputted from the flat convex lens 323 with respect to the DOE 331 or the DOE 332 is less likely to occur, and the range image sensor can measure distance with improved accuracy. In addition, according to the above-explained configuration it is possible to reduce the number of components and it is possible to cut manufacturing costs and parts management costs, so the range image sensor can be made more compact and less expensive.

When viewed from the normal direction (i.e., the y-axis direction) of the plane determined by the first spot beam and the second spot beam split by the DOE 422, the shape of the flat convex lens 423 is a fan shape with an angle substantially the same as the angle formed by the first spot beam and the second spot beam. According to the above-explained configuration, the flat convex lens 423 is such that the percentage to the whole accounted for by parts through which neither the first spot beam nor the second spot beam passes (i.e., the unnecessary parts) is small for example compared to the flat convex lens 323 of the third embodiment, so the range image sensor can be made more compact and less expensive.

Fifth Embodiment

Next, a fifth embodiment of the present invention is explained. A range image sensor 500 according to the fifth embodiment of the present invention is installed in a projector 590 such as the one shown in FIG. 15A, and is provided with a control unit 510, a single parallel-light generating unit 520, a single DOE 530 and an image pickup unit 540, and the projector 590 is provided with an input unit 591 and a projecting unit 592. Explanation is omitted for compositions in common with the first embodiment.

Figure 16A:
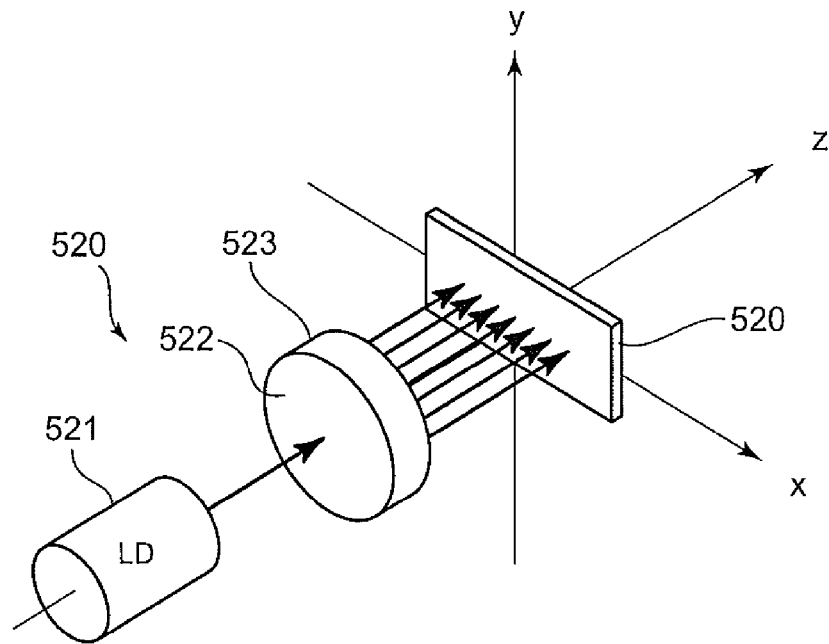
FIG. 16A is a perspective view showing one example of a parallel-light generating unit according to the fifth embodiment.
Figure 16B:
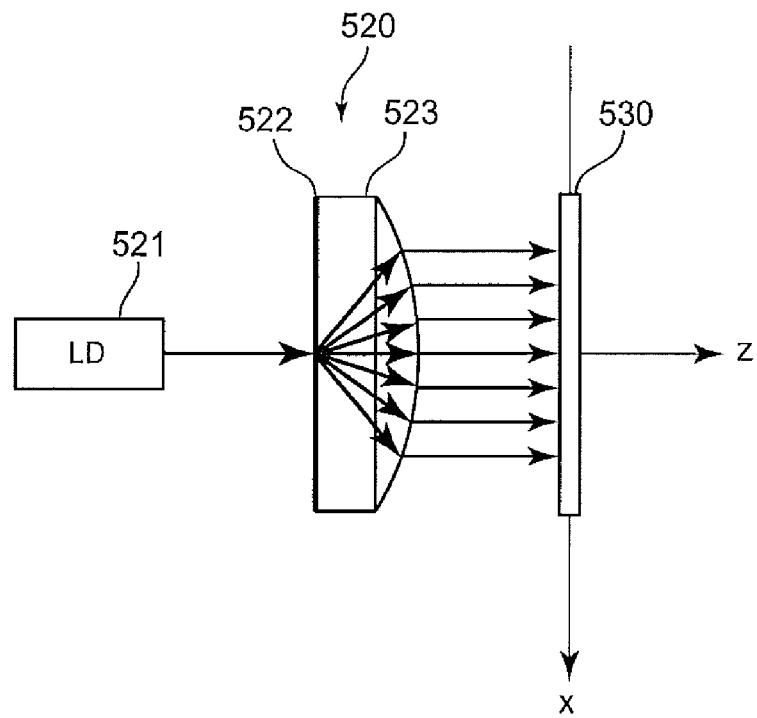
FIG. 16B is a top view showing one example of the parallel-light generating unit of the fifth embodiment.

As shown in FIGS. 16A and 16B, the parallel-light generating unit 520 comprises an LD 521 that generates and outputs a spot beam, a line generator DOE 522 in which is formed a diffractive grating that enlarges the width in the x-axis direction of the spot beam incident from the LD 521, and a flat convex lens 523 that causes a flat beam formed on a flat plane parallel to the x-axis and outputted from the line generator DOE 522 to be incident on the DOE 530 after becoming a parallel beam traveling in the z-axis direction. The parallel-light generating unit 520 may use a Powell lens or the like having equivalent functions in place of the line generator DOE 520.

According to the above-explained configuration, the DOE is inexpensive and compact compared to a cylindrical lens, so the range image sensor 500 is easily made more compact and less expensive than, for example, the case where the parallel-light generating unit 520 comprises an LD that outputs a spot beam, a cylindrical concave lens that enlarges the width in the x-axis direction of the spot beam incident via the LD, and a cylindrical convex lens that converts the flat beam outputted from the cylindrical concave lens into a parallel beam.

Figure 17:
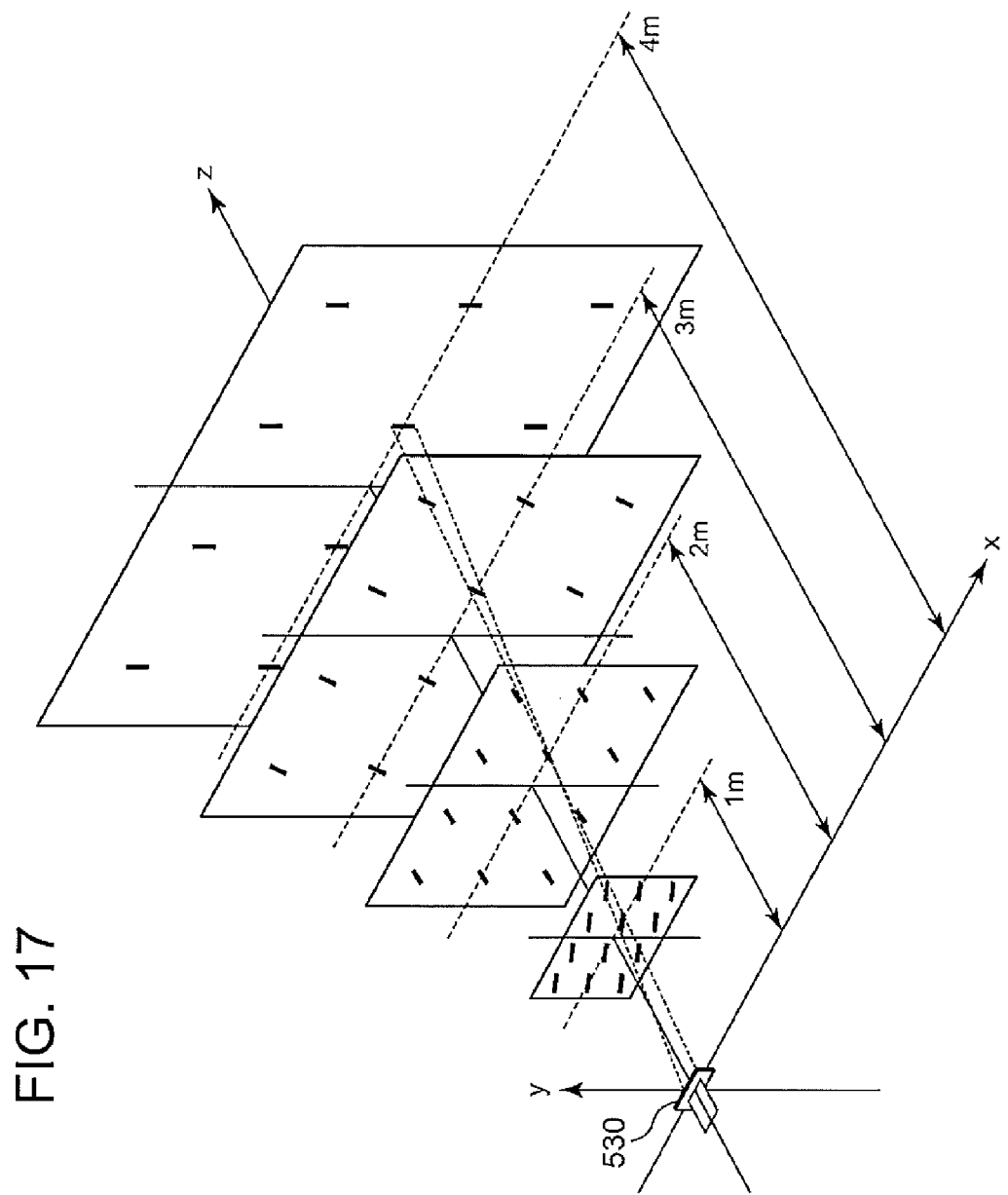
FIG. 17 is a diagram showing one example of a twisted beam outputted from the diffractive optical element according to the fifth embodiment.

As shown in FIG. 17, The range image sensor 500 of the present invention, along with splitting the single flat beam generated by the parallel-light generating unit 520 into twelve twisted beams using the DOE 530, also measures the distance to the twelve points of the projected light spots formed on the object on the basis of the tilting formed with the x-axis by the twelve line segment-shaped projected light spots formed on the object by the twelve twisted beams. A twisted beam means a flat beam of which the rotation angle of the flat plane changes in accordance with distance from the DOE 530.

Figure 18A:
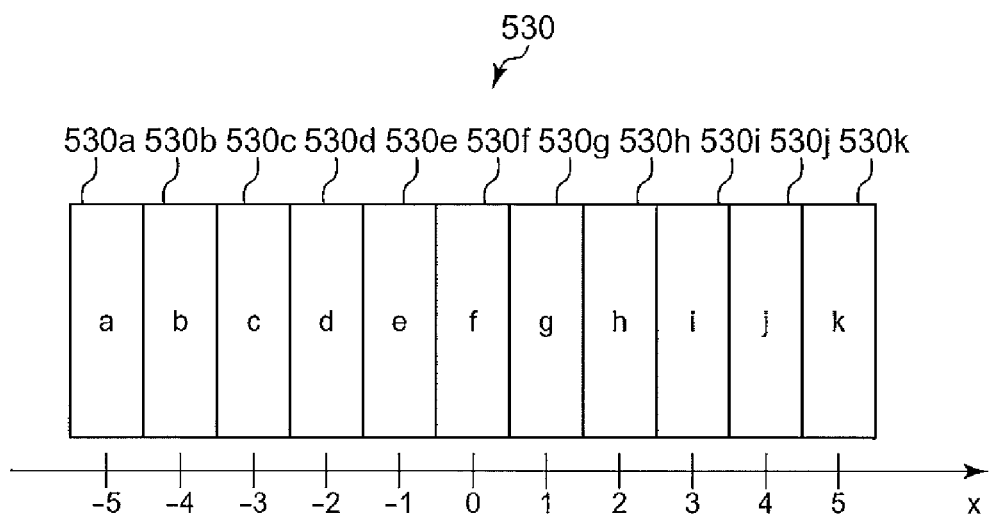
FIG. 18A is a diagram showing one example of the diffractive optical element of the fifth embodiment.

The DOE 530 has eleven diffraction regions 530a to 530k arranged side by side in the x direction, as shown in FIG. 18A. Prior to explaining about the diffraction regions 530a to 530e and 530g to 530k, the diffraction region 530f, which is formed at the position of the origin, is explained.

Figures 18B, 18C:
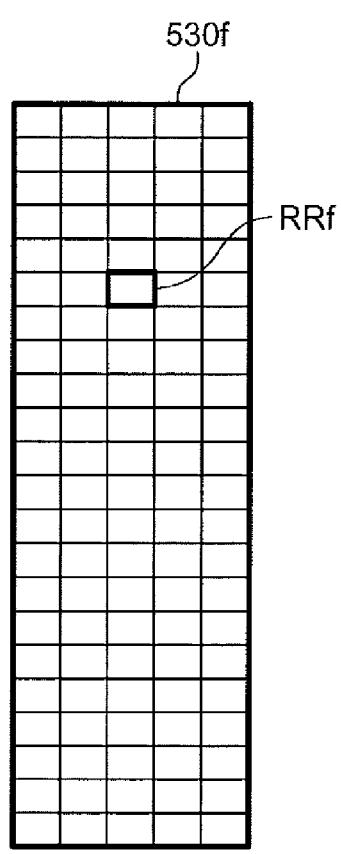
FIG. 18B is a diagram showing one example of the composition of the diffraction region possessed by the diffractive optical element of the fifth embodiment.
FIG. 18C is a diagram showing one example of the composition of the repeated region.

As shown in FIG. 18B, a plurality of repeated regions RRf are formed at the diffractive region 530f in a tiled manner. The repeated regions RRf are arranged at a pitch that is sufficiently smaller than the diameter of laser beam normally outputted. As shown in FIG. 18C, twelve element regions Af to Lf are arranged at the repeated region RRf in a tiled manner. As shown in FIG. 19A, twelve kinds of diffractive gratings having different directions of beam outputted when laser beam going advance in the z-axis direction enters thereto are formed at respective element regions Af to Lf configuring the repeated region RRf.

More specifically, as shown in FIGS. 19A and 19C, when a start point is an origin, the element region Af changes the traveling direction of outputted laser beam into a direction toward an end point EAf represented by coordinate values (−1500, 1000, 4000) shown in FIGS. 19B and 19C. Likewise, the element region Bf changes the traveling direction of outputted laser beam into a direction toward an end point EBf represented by coordinate values (−500, 1000, 4000) when a start point is the origin. Furthermore, the element regions Cf and Df change the traveling direction of laser beam into directions toward end points ECf and EDf, respectively, which correspond to the points shifted by "1000" and "2000" with the x coordinate value of the end point EBf.

Moreover, the element regions Ef to Hf change the traveling direction of laser beam into respective directions toward respective end points EEf to EHf which correspond to the points shifted by "−1000" with the y coordinate value of the end points EAf to EDf. Furthermore, the element regions If to Lf change the traveling direction of laser beam into respective directions toward respective end points EIf to ELf which correspond to the points shifted by "−2000" with the y coordinate value of the end points EAf to EDf.

The diffractive regions 530a to 530e and 530g to 530k shown in FIG. 18A have a plurality of unillustrated repeated regions RRa to RRe and RRg to RRk, respectively, like the diffractive region 530f already explained. The repeated regions RRa to RRe and RRg to RRk have unillustrated element regions Aa to La, Ab to Lb, Ac to Lc, Ad to Ld, Ae to Le, $A^g$ to Lg, Ah to Lh, Ai to Li, Aj to Lj, and Ak to Lk, respectively.

In order to identify those regions Aa to Lk, a diffractive region index and an element region index shown in the table of FIG. 20A are used. The diffractive region index is for identifying a diffractive region including an element region. For example, the element region Aa is included in the diffractive region 530a, so that the diffractive region index of the element region Aa is "a". Moreover, the element region Ab is included in the diffractive region 530b, so that the diffractive index of the element region Ab is "b". Furthermore, the element region index is for identifying the location of the element region in the repeated region. For example, the location of the element region Aa corresponds to the element region Af in the repeated region RRf shown in FIG. 18C, so that the element region index of the element region Aa is "A". Moreover, the location of the element region Ba corresponds to the element region Bf in the repeated region RRf shown in FIG. 18C, so that the element region index of the element region Ba is "B".

When those diffractive region index and element region index are used, respective start points of the element regions Aa to Lk can be expressed by an x coordinate value, a y coordinate value, and a z coordinate value shown in FIGS. 20B to 20D. That is, the locations of the respective start points of the regions Aa to Lk can be expressed as coordinate values (−5, 0, 0) to (5, 0, 0), respectively.

Moreover, respective end points of laser beam passing through respective regions Aa to Lk can be represented by an x coordinate value, a y coordinate value, and a z coordinate value shown n FIGS. 21A to 21C. That is, as shown in FIG. 21A, the element regions identified by the same element region index (i.e., the element regions having the same relative position in the repeated region) change the traveling direction of incident beam into a direction toward respective end points having the same x coordinate value even though the diffractive region index differs (i.e., the diffractive region including the element region differs). Hence, the x coordinate value representing the locations of respective end points of the element regions Aa to Lk is any one of following four coordinate values: "−1500"; "−500"; "+500"; and "+1500".

In contrast, as shown in FIG. 21B, regarding the element regions identified by the same element region index, it changes the traveling direction of incident beam into a direction toward an end point so that the later the diffractive region index is in an alphabet order (i.e., the larger the x coordinate of the start point becomes as shown in FIG. 20B), the larger the y coordinate value of such an end point becomes. Accordingly, the y coordinate values representing respective end points of the element regions Aa to Lk are included in any one of three coordinate ranges: "from 995 to 1005"; "from −5 to +5"; and "from −1005 to −995".

Therefore, according to the above-explained configuration, when parallel beam forming a flat plane parallel to the x-axis enters the DOE 530, the DOE 530 can output twisted beam that changes a rotation angle of the flat plane relative to the x-axis in accordance with the distance from the DOE 530 and splits such beam into at least four directions: a direction in which the x coordinate of the end point becomes "−1500"; a direction in which it becomes "−500"; a direction in which it becomes "+500"; and a direction in which it becomes "+1500".

Moreover, according to the above-explained configuration, when parallel beam forming a flat plane parallel to the x-axis enters the DOE 530, the DOE 530 can output twisted beam, a rotation angle of the flat plane relative to the x-axis of which changes in accordance with the distance from the DOE 530 and can split such beam into at least three directions: a direction in which the y coordinate of the end point is included in a range "from 995 to 1005"; a direction in which it is in a range "from −5 to +5"; and a direction in which it is in a range "from −1005 to −995".

That is, respective end points of the element regions Aa to Lk are classified into twelve patterns based on the x coordinate of the end point and the y coordinate thereof. Hence, when, as shown in FIG. 17, coherent parallel beam forming a flat plane parallel to the x-axis enters the DOE 530, the DOE 530 can output twelve counterclockwise twisted beams into twelve directions.

Consequently, as shown in FIGS. 22A to 22D, as the distance between the projection plane and the start points increases from "1 m" to "4 m", the angle formed by the x-axis and the projected light spots in the shape of line segments formed on the projection plane by the twisted beams increase from "0°" to "90°". Consequently, the angle θ calculated using the tangent and the arctangent calculated from the ratio of the length dx of the line segments in the x-axis direction (the horizontal direction) to the length dy of the line segments in the y-axis direction (the vertical direction) (hereafter called the value dx/dy) is substantially proportional to the distance L from the start point to the projected light spot, as shown in FIG. 22E, and substantially inversely proportional to the reciprocal of the distance L from the start point to the projected light spot as shown in FIG. 22F.

Figure 15A:
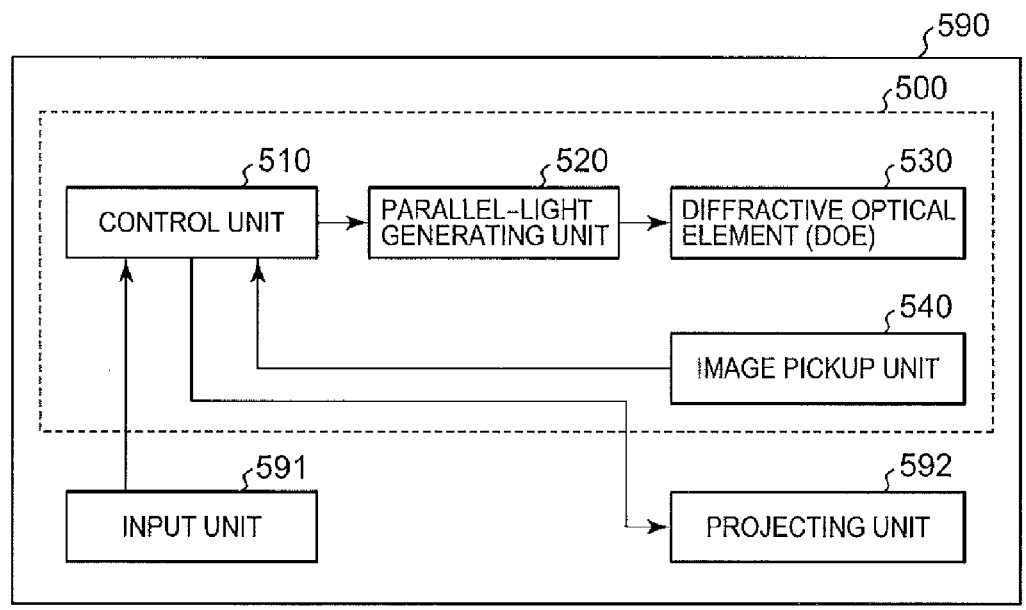
FIG. 15A is a diagram showing one example of the composition of a projector having the range image sensor according to a fifth embodiment.
Figure 15B:
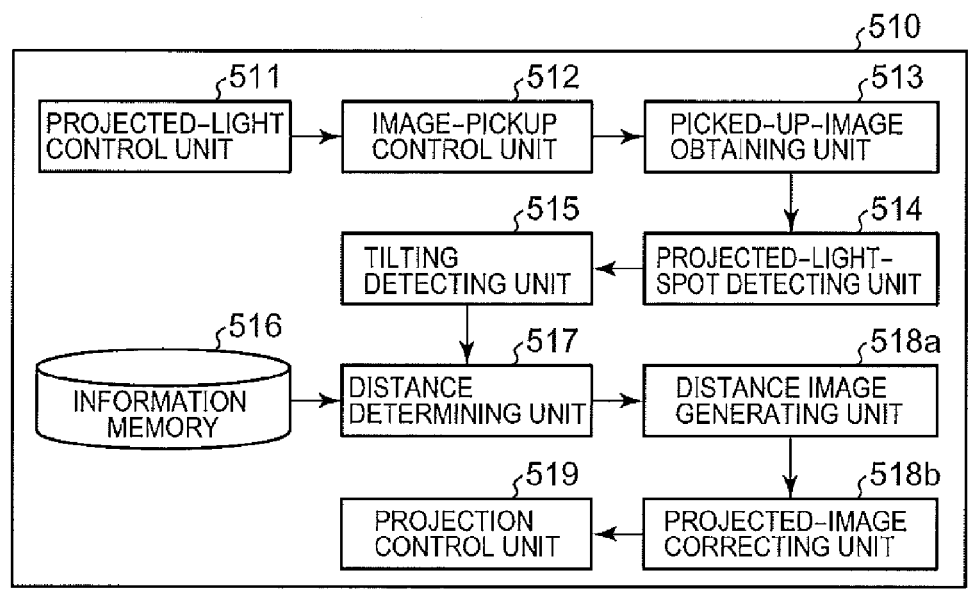
FIG. 15B is a function block diagram showing one example of the functions possessed by the control unit of the fifth embodiment.

The control unit 510 of FIG. 15A, similar to the first embodiment, executes the image projection process shown in FIG. 7 and functions as a projected-light control unit 511, an image controller 512, a picked-up-image obtaining unit 513, a projected-light-spot detecting unit 514, a tilting detecting unit 515, an information memory unit 516, a distance determining unit 517, a range image generating unit 518a, a projected-image correcting unit 518b and a projection control unit 519 shown in FIG. 15B.

The information memory unit 516 stores tables storing plural pieces of information associated with information indicating the angle θ formed by the x-axis and the projected light spot and information expressing the distance L to the projected light spot as shown in FIG. 22E.

The tilting detecting unit 515 calculates the value dx/dy with respect to the twelve projected light spots detected from the picked-up images by the spot detection unit 514, and detects the twelve angles formed by the projected light spots and the x-axis using the calculated values dx/dy.

The distance determining unit 517 determines (measures) the respective distances to the twelve points on the projected light spots formed on the object, by searching from the above described table information recorded by the information memory unit 516 indicating the distances corresponding to the information expressing the angles, respectively, for the twelve angles detected by the tilting detecting unit 515.

According to the above-explained configuration, the tilting detecting unit 515 can detect the angle of rotation with the x-axis on the basis on more pixels than the pixels expressing the point-shaped projected light spots, like the range image sensor 100 of the first embodiment, for example, by detecting the angle of rotation with the x-axis on the basis of a plurality of pixels expressing line segment-shaped projected light spots. Consequently, the range image sensor 500 can detect the angle of rotation very accurately, so it is possible to determine the distance very accurately.

First Modified Example of Fifth Embodiment

Figure 11A:
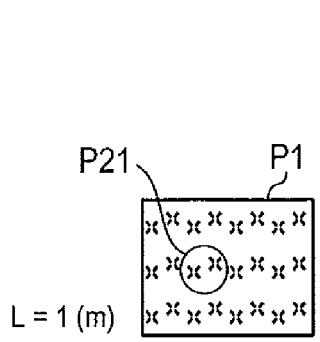
FIG. 11A is a diagram showing one example of the first projected light spot and the second projected light spot projected on a projection plane distant from the diffractive optical element of the second embodiment by a distance "1 m"
Figure 11B:
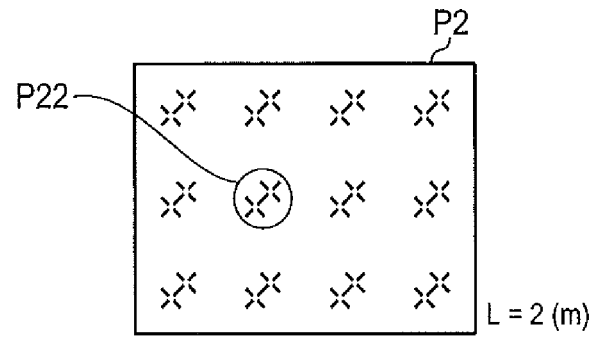
FIG. 11B is a diagram showing one example of the first projected light spot and the second projected light spot projected on a projection plane distant from the diffractive optical element of the second embodiment by a distance "2 m"
Figure 11C:
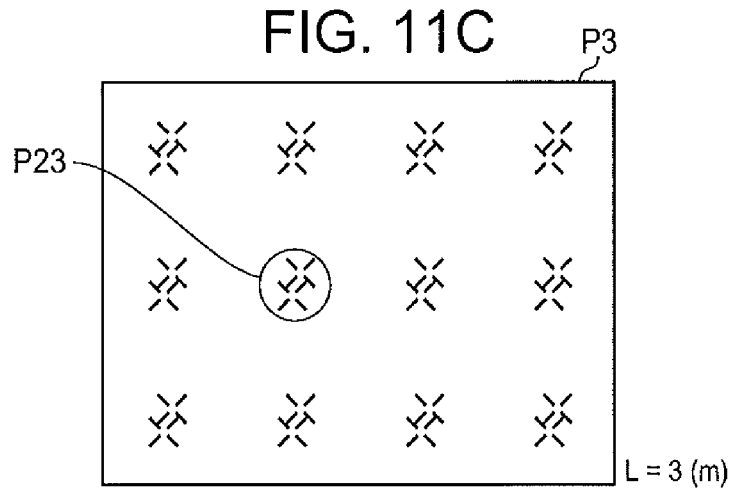
FIG. 11C is a diagram showing one example of the first projected light spot and the second projected light spot projected on a projection plane distant from the diffractive optical element of the second embodiment by a distance "3 m"
Figure 11D:
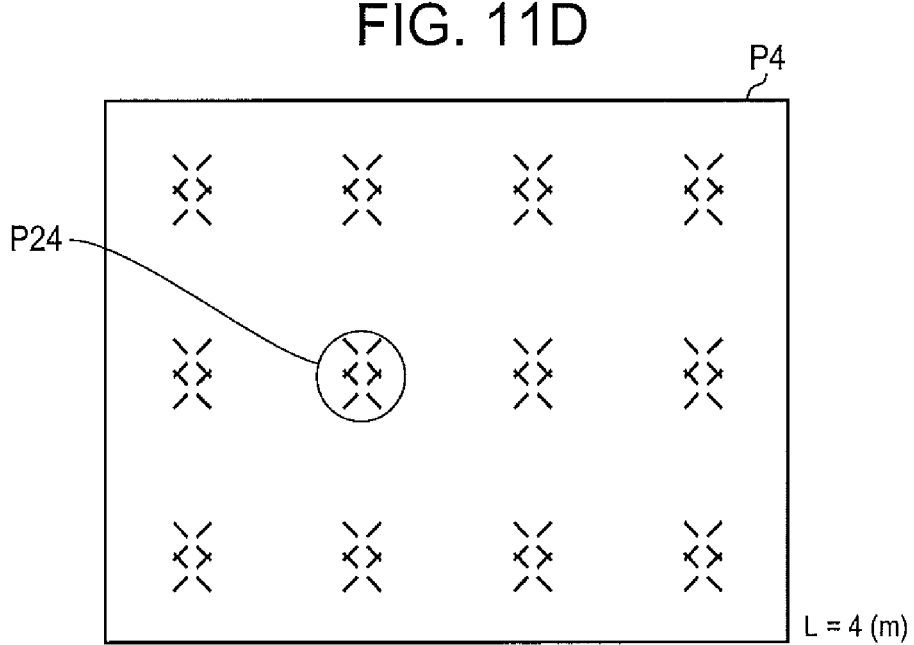
FIG. 11D is a diagram showing one example of the first projected light spot and the second projected light spot projected on a projection plane distant from the diffractive optical element of the second embodiment by a distance "4 m"
Figure 12A:
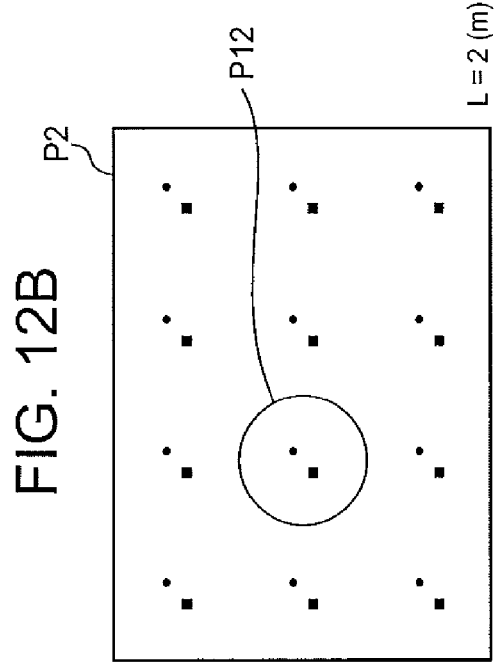
FIG. 12A is a diagram showing one example of a picked-up image showing the first projected light spot and the second projected light spot projected on a projection plane distant from the diffractive optical element of the second embodiment by a distance "1 m"
Figure 12B:
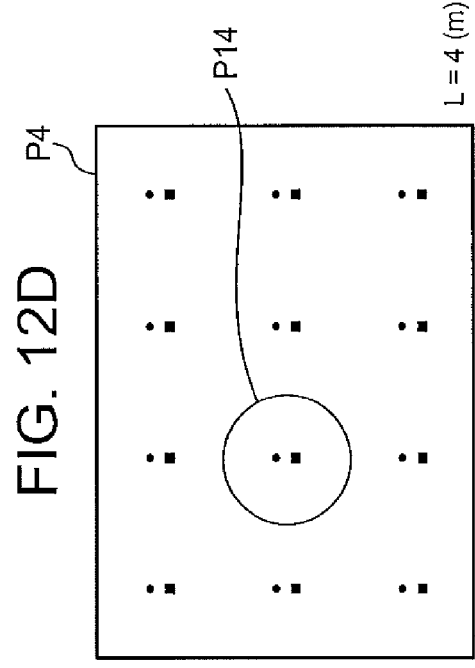
FIG. 12B is a diagram showing one example of a picked-up image showing the first projected light spot and the second projected light spot projected on a projection plane distant from the diffractive optical element of the second embodiment by a distance "2 m"
Figure 12C:
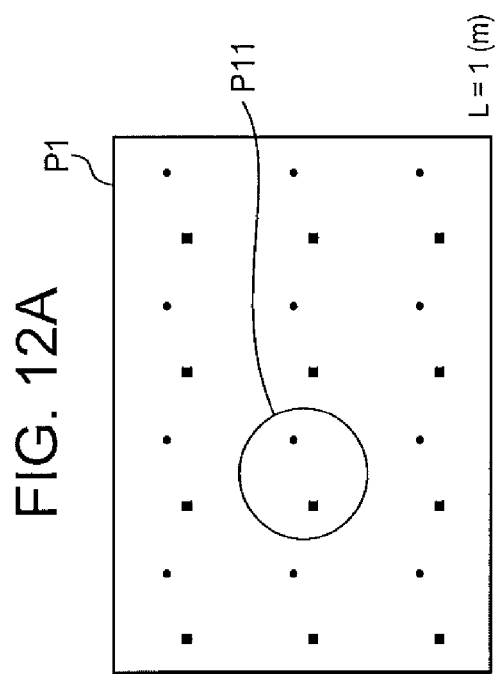
FIG. 12C is a diagram showing one example of a picked-up image showing the first projected light spot and the second projected light spot projected on a projection plane distant from the diffractive optical element of the second embodiment by a distance "3 m"
Figure 12D:
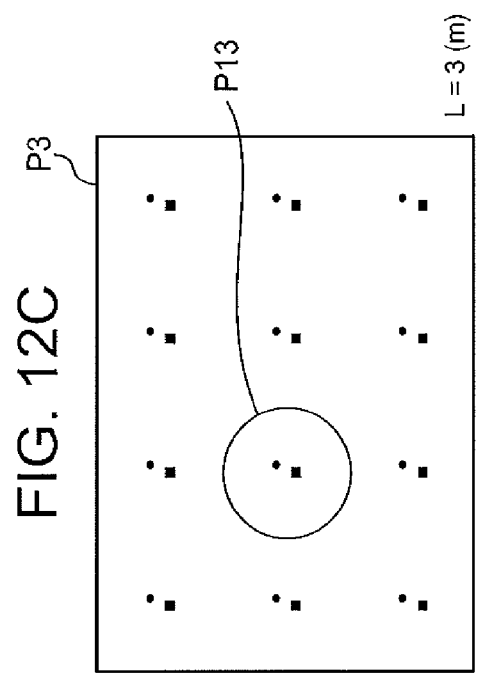
FIG. 12D is a diagram showing one example of a picked-up image showing the first projected light spot and the second projected light spot projected on a projection plane distant from the diffractive optical element of the second embodiment by a distance "4 m"

In the fifth embodiment, the element regions identified by the same element region index possessed by the repeated regions RRa to RRk of the DOE 530 were explained as outputting a plurality of twisted beams with counterclockwise rotations, the traveling direction of the incident beam on which is changed to a direction toward end points with larger y coordinate values, to the extent that the diffraction region index becomes a later index in alphabetical order (i.e., to the extent that the x coordinates of the start points become larger, as shown in FIG. 20B). However, this is intended to be illustrative and not limiting, for the DOE 530 may have right repeated regions RRa' to RRk' in place of the repeated regions RRa to RRk (hereafter called the left repeated regions RRa to RRk) and the element regions identified by the same element region index possessed by the right repeated regions RRa' to RRk' may output a plurality of twisted beams with clockwise rotations, the traveling direction of the incident beam on which is changed to a direction toward end points with smaller y coordinate values, to the extent that the diffraction region index becomes a later index in alphabetical order (i.e., to the extent that the x coordinates of the start points become larger, as shown in FIG. 11B).

Second Modified Example of Fifth Embodiment

In the fifth embodiment and the first modified example of fifth embodiment, the explanation was such that when a flat beam forming a flat plane parallel to the x-axis is incident on the DOE 530, the DOE 530 may output clockwise or counterclockwise twisted beams with the angle of rotation of the flat plane to the x-axis changing in accordance with the distance from the DOE 530, splitting such into at least four directions, namely the direction with the x coordinate of the end point being "−1500", the direction with "−500", the direction with "+500" and the direction with "+1500". In addition, in this composition when a flat beam forming a flat plane parallel to the x-axis is incident on the DOE 530, the DOE 530 may output clockwise or counterclockwise twisted beams with the angle of rotation of the flat plane to the x-axis changing in accordance with the distance from the DOE 530, splitting such into at least three directions, namely directions in which the y coordinate of the end point is included in "995 to 1005", "−5 to +5" or "−1005 to −995".

However, this is intended to be illustrative and not limiting, for when a flat beam forming a flat plane parallel to the y-axis is incident on the DOE 530, the DOE 530 may output clockwise or counterclockwise twisted beams with the angle of rotation of the flat plane to the x-axis changing in accordance with the distance from the DOE 530, splitting such into at least four directions, namely the directions with the y coordinates of the end point being "−1500", the direction with "−500", or "+500" and the direction with "+1500". In addition, in this composition when a flat beam forming a flat plane parallel to the y-axis is incident on the DOE 530, the DOE 530 may output clockwise or counterclockwise twisted beams with the angle of rotation of the flat plane to the x-axis changing in accordance with the distance from the DOE 530, splitting such into at least three directions, namely directions in which the x coordinate of the end point is included in "995 to 1005", "−5 to +5" or "−1005 to −995".

Sixth Embodiment

Next, a sixth embodiment will be described. The range image sensor according to the sixth embodiment of the present invention, similar to the fifth embodiment, comprises a single parallel-light generating unit 620 that generates a flat beam, and a single DOE 630 that splits the single flat beam into twelve twisted beams. Explanation is omitted for compositions in common with the fifth embodiment.

Figure 23A:
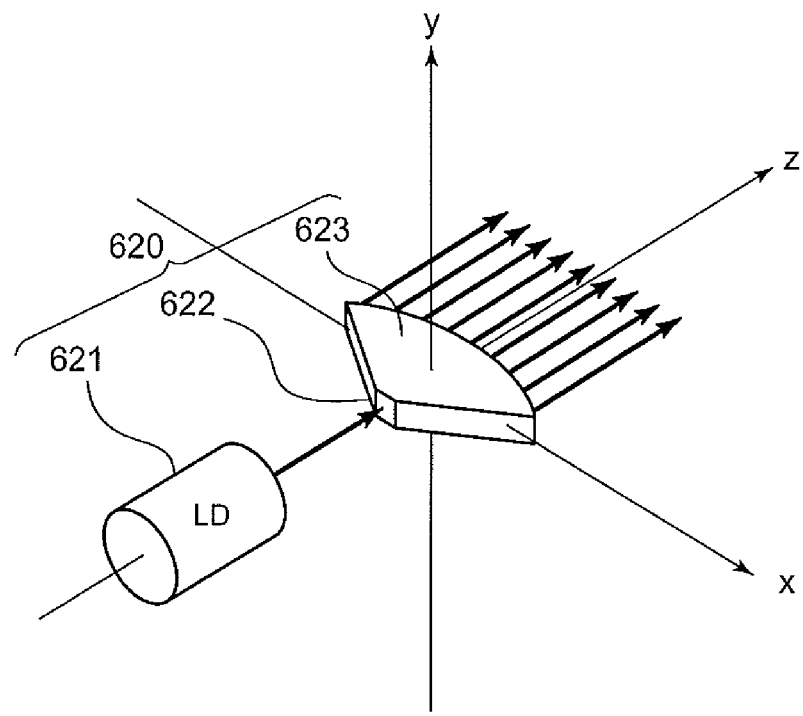
FIG. 23A is a perspective view showing one example of a parallel-light generating unit according to a sixth embodiment.
Figure 23B:
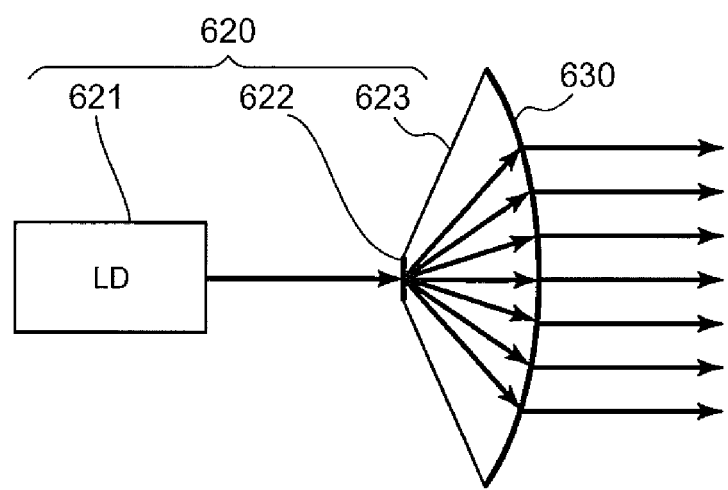
FIG. 23B is a top view showing one example of the parallel-light generating unit according to the sixth embodiment.

As shown in FIGS. 23A and 23B, the parallel-light generating unit 620 comprises an LD 621 that generates and outputs a spot beam, a line generator DOE 622 in which is formed a diffractive grating that enlarges the width in the x-axis direction of the spot beam incident from the LD 621, a flat convex lens 623 that converts the flat beam outputted from the DOE 622 into a parallel beam advancing in the x-axis direction, and a DOE 630 comprising a groove-shaped diffractive grating formed on the surface of the flat convex lens 623.

According to the above-explained configuration, because the DOE 630 is formed on the surface of the flat convex lens 623, the relative positioning accuracy of the flat convex lens 623 and the DOE 630 is improved compared, for example, to a case in which the flat convex lens 523 and the DOE 530 are separate components, as in the fifth embodiment. Consequently, it is less likely for deviations in the incident angle of the flat beam outputted from the flat convex lens 623 on the DOE 630 to occur, for example, so the range image sensor can measure the distance with greater accuracy. In addition, according to the above-explained configuration it is possible to reduce the number of components and thus is possible to reduce manufacturing costs and parts management costs, so the range image sensor can be made more compact and less expensive.

The shape of the flat convex lens 623 is a fan shape roughly matching the shape of the flat beam passing through the flat convex lens 623 when viewed from the normal direction to the flat plane possessed by the flat beam whose width is expanded by the DOE 622 (i.e., the y-axis direction). According to the above-explained configuration, the flat convex lens 623 is such that percentage to the whole accounted for by parts through which the flat beam does not pass (i.e., the unnecessary components) is small compared for example to the flat convex lens 523 of the fifth embodiment, so the range image sensor can be made more compact and less expensive.

Figure 8B:
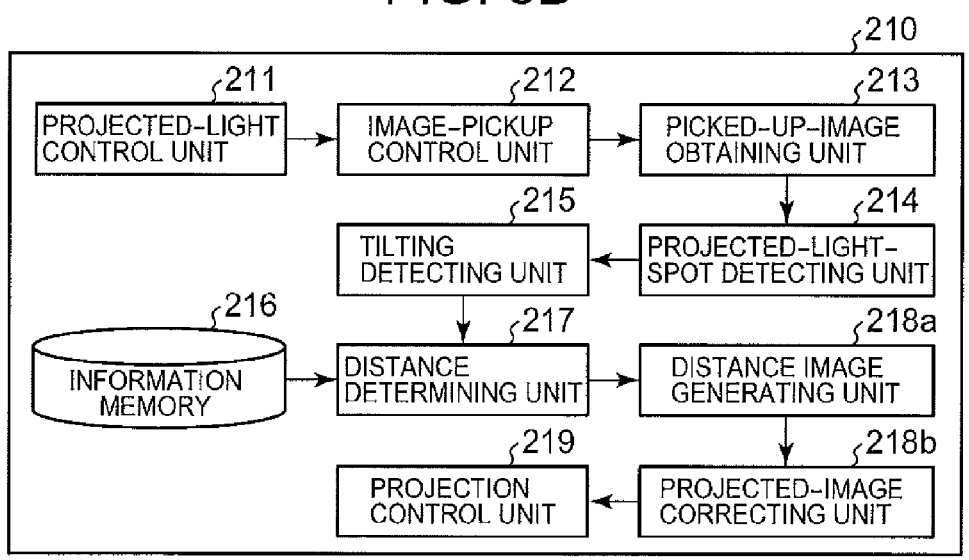
FIG. 8B is a functional block diagram showing one example of the functions possessed by the control unit of the second embodiment.

As shown in FIG. 2C, FIG. 8B, and FIG. 15B, etc., if the range image sensors 100, 200, 300 and 500 illustrated by the above-described embodiments further comprise range image generating units that generate range images having a plurality of pixel values in accordance with the plurality of distances obtained by the range image sensor, it is possible to realize a range image generating apparatus.

A range image sensor employing a configuration beforehand for realizing the functions of the present invention can be provided, but an existing range image sensor can be caused to function as the range image sensor of the present invention by an application of a program. That is, if a range image generating program that realizes respective functional configurations by the range image sensors 100, 200, 300 and 500, etc., is applied so that a computer (e.g., a CPU) controlling the existing range image sensor can run such a program, the existing range image sensor can be caused to function as the range image sensors 100, 200, 300 and 500, etc. Moreover, the range image data obtaining method of the present invention can be carried out using the range image sensors 100, 200, 300 and 500, etc. of the present invention, exemplified in the above-explained embodiments. Similarly, if the range image data obtaining program according to the present invention as illustrated by the above-described embodiments is further equipped with a range image generation step for generating a range image possessing a plurality of pixel counts in accordance with the plurality of distances obtained by the range image data obtaining method, it is possible to realize a range image generating method.

How to distribute such a program is not limited to any particular scheme, and for example, such a program can be distributed in a manner being stored in a recording medium, such as a memory card, a CD-ROM, or a DVD-ROM, or can be distributed over a communication medium like the Internet.

Preferred embodiments of the present invention were explained above in detail, but the present invention is not limited to any particular embodiment, and can be changed and modified in various forms within the scope and spirit of the present invention.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A range image sensor comprising:
   a parallel-light generating unit that, in a coordinate space defined by an x-axis, a y-axis and a z-axis, generates parallel light that advances in the z-axis direction;
   a diffraction unit that includes a diffractive grating that changes a traveling direction of the generated parallel light such that (i) the generated parallel light is split into split light beams, and (ii) angles become predetermined angles on a predetermined projection plane intersecting the z-axis, each of the angles being formed by (a) the x-axis and (b) each of line segments determined by one of projected light spots formed by the split light beams;
   an image pickup unit that picks up the projected light spots formed on an object by the split light beams outputted from the diffraction unit; and
   a distance determining unit that determines a plurality of distances to the projected light spots based on a tilting with respect to the x-axis of the line segments determined by the projected light spots picked up by the image pickup unit.

2. The range image sensor according to claim 1, wherein the diffraction unit changes the traveling direction of the generated parallel light such that the projected light spots formed on the predetermined projection plane by the split light beams become predetermined marks indicating end points of the line segments;
   wherein the range image sensor further comprises a projected-light-spot detecting unit that detects the predetermined marks from a picked-up image picked up by the image pickup unit; and
   wherein the distance determining unit determines the plurality of distances to the projected light spots based on the tilting with respect to the x-axis of the line segments determined by the end points indicated by the predetermined marks detected.

3. The range image sensor according to claim 2, wherein the parallel-light generating unit comprises:
   a generator that generates light;
   an optical element that includes a diffractive grating for splitting the light generated by the generator into a first beam and a second beam; and
   a lens that converts (i) the first beam outputted from the optical element into a first parallel beam traveling in the z-axis direction, and (ii) the second beam outputted from the optical element into a second parallel beam traveling in the z-axis direction;
   wherein the diffraction unit comprises:
     a first diffractive optical element that includes a diffractive grating that changes the traveling direction of the first parallel beam such that the first parallel beam is split into first split beams; and
     a second diffractive optical element that includes a diffractive grating that changes the traveling direction of the second parallel beam such that (i) the second parallel beam is split into second split beams, and (ii) an angle becomes a predetermined angle, the angle being formed by the x-axis and line segments determined by (A) the first projected light spots formed by the first split beams on the predetermined projection plane, and (B) the second projected light spots formed by the second split beams on the predetermined projection plane;
   wherein the image pickup unit picks up (i) the first projected light spots formed on the object, and (ii) the second projected light spots formed on the object; and
   wherein the distance determining unit determines the plurality of distances based on the tilting with respect to the x-axis of the line segments determined by the first projected light spots and the second projected light spots picked up by the image pickup unit.

4. The range image sensor according to claim 3, wherein the diffraction unit is formed on a surface of the lens possessed by the parallel-light generating unit.

5. The range image sensor according to claim 3, wherein the lens comprises a cylindrical lens, and the diffraction unit is disposed on a curved surface of the cylindrical lens.

6. The range image sensor according to claim 5, wherein the diffractive grating for splitting the light generated by the generator into the first beam and the second beam is disposed on a flat surface of the cylindrical lens.

7. The range image sensor according to claim 2, wherein the predetermined marks comprise a plurality of line segments.

8. The range image sensor according to claim 1,
   wherein the parallel light generated by the parallel-light generating unit is a parallel light forming a flat plane parallel to the x-axis and advancing in the z-axis direction;
   wherein the diffraction unit (i) splits the parallel light generated by the parallel-light generating unit into split light beams each forming a flat plane, and (ii) changes the traveling direction of the generated parallel light such that the angle becomes a predetermined angle, the angle being formed by the x-axis and the line-segment-shaped projected light spots formed on the predetermined projection plane provided by the flat plane of the split light beams; and wherein the distance determining unit determines the plurality of distances to the projected light spots based on the tilting with respect to the x-axis of the line segment-shaped projected light spots picked up by the image pickup unit.

9. The range image sensor according to claim 8, wherein the parallel-light generating unit comprises:
a generator that generates spot beams;
an optical element that includes a diffractive grating for converting the spot beams generated by the generator into flat beams by expanding the width in the x-axis direction of the spot beams; and
a lens that converts the flat beams outputted from the optical element into parallel light traveling in the z-axis direction.

10. The range image sensor according to claim 9, wherein the diffraction unit is formed on the surface of the lens possessed by the parallel-light generating unit.

11. A range image data obtaining method comprising:
a parallel-light generating step that, in a coordinate space defined by an x-axis, a y-axis and a z-axis, generates parallel light that advances in the z-axis direction;
a diffraction step that changes a traveling direction of the generated parallel light such that (i) the generated parallel light is split into split light beams, and (ii) angles become predetermined angles on a predetermined projection plane intersecting the z-axis, each of the angles being formed by (a) the x-axis and (b) each of a line segments determined by one of projected light spots formed by the split light beams;
an image pickup step that picks up the projected light spots formed on an object by the split light beams outputted by the diffraction step; and
a distance determining step that determines a plurality of distances to the projected light spots based on a tilting with respect to the x-axis of the line segments determined by the projected light spots picked up in the image pickup step.

12. A range image generating apparatus comprising:
a parallel-light generating unit that, in a coordinate space defined by an x-axis, a y-axis and a z-axis, generates parallel light that advances in the z-axis direction;
a diffraction unit that includes a diffractive grating that changes a traveling direction of the generated parallel light such that (i) the generated parallel light is split into split light beams, and (ii) angles become predetermined angles on a predetermined projection plane intersecting the z-axis, each of the angles being formed by (a) the x-axis and (b) each of line segments determined by one of projected light spots formed by the split light beams;
an image pickup unit that picks up the projected light spots formed on an object by the split light beams outputted from the diffraction unit;
a distance determining unit that determines a plurality of distances to the projected light spots based on a tilting with respect to the x-axis of the line segments determined by the projected light spots picked up by the image pickup unit; and
a range image generating unit that generates a range image having pixel values in accordance with the plurality of distances determined by the distance determining unit.

13. A range image generating method comprising:
a parallel-light generating step that, in a coordinate space defined by an x-axis, a y-axis and a z-axis, generates parallel light that advances in the z-axis direction;
a diffraction step that changes a traveling direction of the generated parallel light such that (i) the generated parallel light is split into split light beams, and (ii) angles become predetermined angles on a predetermined projection plane intersecting the z-axis, each of the angles being formed by (a) the x-axis and (b) each of line segments determined by one of projected light spots formed by the split light beams;
an image pickup step that picks up the projected light spots formed on an object by the split light beams outputted by the diffraction step;
a distance determining step that determines a plurality of distances to the projected light spots based on a tilting with respect to the x-axis of the line segments determined by the projected light spots picked up in the image pickup step; and
a range image generating step that generates a range image having pixel values in accordance with the plurality of distances determined in the distance determining step.

* * * * *